US012713280B2

(12) United States Patent
Ma et al.

(10) Patent No.: US 12,713,280 B2
(45) Date of Patent: Aug. 18, 2026

(54) COMMUNICATION METHOD, APPARATUS, AND SYSTEM

(71) Applicant: HUAWEI TECHNOLOGIES CO., LTD., Shenzhen (CN)

(72) Inventors: Jingwang Ma, Shanghai (CN); Qufang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 700 days.

(21) Appl. No.: 18/063,757

(22) Filed: Dec. 9, 2022

(65) Prior Publication Data

US 2023/0103418 A1 Apr. 6, 2023

Related U.S. Application Data

(63) Continuation of application No. PCT/CN2021/089070, filed on Apr. 22, 2021.

(30) Foreign Application Priority Data

Jun. 10, 2020 (CN) ......................... 202010524001.1

(51) Int. Cl.
*H04W 28/02* (2009.01)

(52) U.S. Cl.
CPC ... *H04W 28/0263* (2013.01); *H04W 28/0215* (2013.01)

(58) Field of Classification Search
CPC ......... H04W 28/0215; H04W 28/0263; H04W 28/10
See application file for complete search history.

(56) References Cited

U.S. PATENT DOCUMENTS

2007/0268831 A1 11/2007 Balazs et al.
2018/0192472 A1 7/2018 Callard
2019/0116518 A1 4/2019 Stojanovski et al.
2021/0289390 A1* 9/2021 Zhou ................ H04W 28/0933
2021/0344735 A1* 11/2021 Ke ..................... H04L 47/2491
(Continued)

FOREIGN PATENT DOCUMENTS

CN 110035018 A 7/2019
CN 110691370 A 1/2020
(Continued)

OTHER PUBLICATIONS

Tencent, “Clean Up of Use Case and Requirements for 5.3,” 3GPP TSG-SA WG1 Meeting #86, S1-191100, Suzhou, China, May 6-10, 2019, 6 pages.

(Continued)

*Primary Examiner* — Donald L Mills
(74) *Attorney, Agent, or Firm* — Fish & Richardson P.C.

(57) ABSTRACT

This application provides example communication methods, apparatuses, and systems. One example method includes receiving, by a user plane network element, characteristic information of a service data flow, where the characteristic information describes a characteristic of the service data flow. The user plane network element identifies a data packet group in the service data flow based on the characteristic information of the service data flow. The user plane network element sends the data packet group to an access network device.

16 Claims, 10 Drawing Sheets

(56) References Cited

U.S. PATENT DOCUMENTS

| | | | | |
|---|---|---|---|---|
| 2021/0399989 A1* | 12/2021 | Wang | H04L 47/24 | |
| 2023/0102218 A1* | 3/2023 | Xu | H04L 41/00 | 370/235 |

FOREIGN PATENT DOCUMENTS

| | | |
|---|---|---|
| WO | 2018204793 A1 | 11/2018 |
| WO | 2020036928 A1 | 2/2020 |

OTHER PUBLICATIONS

Office Action in Japanese Appln. No. 2022-576184, mailed on Nov. 13, 2023, 7 pages (with English translation).
Extended European Search Report in European AppIn No. 21822645.4, dated Nov. 13, 2023, 14 pages.
Huawei et al., “Call flows for DDD status event with UPF buffering,” 3GPP TSG-WG SA2 Meeting #135, S2-1909250, Split, Croatia, Oct. 14-18, 2019, 4 pages.
3GPP TS 23.501 V16.4.0, “3rd Generation Partnership Project; Technical Specification Group Services and System Aspects; System architecture for the 5G System (5GS); Stage 2 (Release 16),” Mar. 2020, 430 pages.
Office Action in Indian Appln. No. 202247072570, dated Feb. 15, 2023, 5 pages (with English translation).
International Search Report and Written Opinion in International AppIn. No. PCT/CN2021/089070, mailed on Jul. 27, 2021, 17 pages (with English translation).
European Search Report in European Appln. No. 25188576.0, mailed on Feb. 19, 2026, 9 pages.

* cited by examiner 16.7 ms

A peak rate is 0.48 Mb/ms

Service data flow 1

Service data flow 2

A peak rate is 0.6 Mb/ms

Before shaping

After shaping

COMMUNICATION METHOD, APPARATUS, AND SYSTEM

CROSS-REFERENCE TO RELATED APPLICATION

This application is a continuation of International Patent Application No. PCT/CN2021/089070, filed on Apr. 22, 2021, which claims priority to Chinese Patent Application No. 202010524001.1, filed on Jun. 10, 2020. The disclosures of the aforementioned applications are hereby incorporated by reference in their entireties.

TECHNICAL FIELD

This application relates to the field of communication technologies, and in particular, to a communication method, an apparatus, and a system.

BACKGROUND

Currently, in some scenarios such as augmented reality (AR), virtual reality (VR), and a tactile network, a requirement for real-time performance of data transmission is high. To be specific, a specific amount of data needs to be sent in a short transmission time window.

When a requirement for real-time performance is high, how to implement appropriate control on data that needs to be sent to improve efficiency of data transmission is a problem that urgently needs to be resolved currently.

SUMMARY

This application provides a communication method, an apparatus, and a system, to improve efficiency of data transmission.

According to a first aspect, an embodiment of this application provides a communication method, including: A user plane network element receives characteristic information of a service data flow, where the characteristic information is used to describe a characteristic of the service data flow; the user plane network element identifies a data packet group in the service data flow based on the characteristic information of the service data flow; and the user plane network element sends the data packet group to an access network device.

Based on the foregoing embodiment, the data packet group in the service data flow may be identified based on the pre-obtained characteristic information of the service data flow, so that corresponding processing can be further performed on the data packet group. This helps improve transmission efficiency of the service data flow.

In a possible implementation method, the characteristic information includes a data feature of an initial packet and a feature of a tail packet of the data packet group. That the user plane network element identifies a data packet group in the service data flow based on the characteristic information of the service data flow includes: The user plane network element identifies the initial packet of the data packet group based on the data feature of the initial packet; and the user plane network element identifies the tail packet of the data packet group based on the data feature of the tail packet.

Based on the foregoing solution, each data packet group in the service data flow may be identified based on the characteristic information of the service data flow, so that each data packet group in the service data flow can be processed, to improve transmission efficiency of the service data flow.

In a possible implementation method, the characteristic information includes a data packet group sending interval, and the data packet group sending interval indicates a sending time interval between two adjacent data packet groups in the service data flow. That the user plane network element identifies a data packet group in the service data flow based on the characteristic information of the service data flow includes: The user plane network element identifies the data packet group in the service data flow based on the data packet group sending interval.

In a possible implementation method, the user plane network element adds a same data packet group identifier to all data packets of the data packet group.

Based on the foregoing solution, each data packet group may be identified based on the data packet group identifier, so that a receiving side (for example, the access network device) can identify each data packet group in the service data flow, and the receiving side can process each data packet group, to improve transmission efficiency of the service data flow.

In a possible implementation method, the user plane network element performs scheduling processing on the data packet group based on the characteristic information.

In a possible implementation method, the characteristic information includes a pulse peak rate and a pulse interval that correspond to the data packet group, and the pulse interval is a sending time interval between two adjacent pulses corresponding to the data packet group. That the user plane network element performs scheduling processing on the data packet group based on the characteristic information includes: The user plane network element reduces, based on the pulse peak rate and the pulse interval that correspond to the data packet group, the pulse peak rate corresponding to the data packet group, so that a reduced pulse peak rate corresponding to the data packet group does not exceed a preconfigured maximum pulse peak rate. The maximum pulse peak rate is a maximum pulse peak rate of a single service data flow or a maximum aggregated pulse peak rate of a plurality of service data flows.

Based on the foregoing solution, the user plane network element may perform traffic shaping on the service data flow, to reduce pressure of a high-rate service on network transmission, and improve efficiency of data transmission.

In a possible implementation method, the user plane network element receives the maximum pulse peak rate from a session management network element.

In a possible implementation method, the characteristic information is from an application server; the characteristic information is from a database, and the characteristic information in the database is from an application server; or the characteristic information is from the session management network element, and the characteristic information in the session management network element is from an application server.

According to a second aspect, an embodiment of this application provides a communication method, including: An access network device receives characteristic information of a service data flow, where the characteristic information is used to describe a characteristic of the service data flow; the access network device receives the service data flow from a user plane network element; the access network device identifies a data packet group in the service data flow; and the access network device sends the data packet group based on the characteristic information.

Based on the foregoing embodiment, the service data flow may be sent based on the pre-obtained characteristic information of the service data flow, to improve transmission efficiency of the service data flow.

In a possible implementation method, that the access network device identifies a data packet group in the service data flow includes: The access network device determines that data packets that are in the service data flow and that carry a same data packet group identifier belong to a same data packet group; or the access network device identifies the data packet group based on a data packet group sending interval, where the characteristic information includes the data packet group sending interval, and the data packet group sending interval indicates a sending time interval between two adjacent data packet groups in the service data flow.

Based on the foregoing solution, the access network device may identify each data packet group in the service data flow based on the characteristic information of the service data flow, so that each data packet group in the service data flow can be processed, to improve transmission efficiency of the service data flow.

In a possible implementation method, that the access network device sends the data packet group based on the characteristic information includes: The access network device determines a scheduling policy of the data packet group based on the characteristic information; and the access network device sends the data packet group according to the scheduling policy of the data packet group.

In a possible implementation method, the characteristic information includes a sending time window of the data packet group, and the sending time window of the data packet group indicates maximum sending duration for sending the data packet group. That the access network device determines a scheduling policy of the data packet group based on the characteristic information includes: The access network device determines a plurality of time periods corresponding to the sending time window of the data packet group and scheduling policies corresponding to the plurality of time periods. A sending rate indicated by a scheduling policy corresponding to a later time period is higher than a sending rate indicated by a scheduling policy corresponding to an earlier time period. That the access network device sends the data packet group according to the scheduling policy of the data packet group includes: The access network device sends the data packet group according to the scheduling policies corresponding to the plurality of time periods.

Based on the foregoing solution, the access network device may implement different scheduling policies for different time periods in a same sending time window, to ensure that one data packet group can be completely sent in one sending time window, and ensure reliable transmission of the service data flow.

In a possible implementation method, the characteristic information includes the data packet group sending interval, and the data packet group sending interval indicates the sending time interval between the two adjacent data packet groups in the service data flow. The access network device schedules a transmission resource of the data packet group based on the data packet group sending interval.

In a possible implementation method, that the access network device schedules a transmission resource of the data packet group based on the data packet group sending interval includes: The access network device receives channel state information CSI from a terminal device based on the data packet group sending interval; and the access network device determines, based on status information of one or more subcarriers indicated by the CSI, a sending occasion of the data packet group and the subcarrier for sending the data packet group. That the access network device sends the data packet group based on the characteristic information includes: The access network device sends the data packet group based on the sending occasion of the data packet group and the subcarrier for sending the data packet group.

Based on the foregoing solution, the access network device may determine, based on the CSI reported by the terminal device, the sending occasion and the subcarrier for sending the data packet group, so that efficiency of data transmission can be improved.

In a possible implementation method, the characteristic information further includes a pulse peak rate and a pulse interval that correspond to the data packet group, and the pulse interval is a sending time interval between two adjacent pulses corresponding to the data packet group. That the access network device determines, based on status information of one or more subcarriers indicated by the CSI, a sending occasion of the data packet group and the subcarrier for sending the data packet group includes: The access network device determines, based on the status information of the one or more subcarriers indicated by the CSI, the pulse peak rate, and the pulse interval, a quality requirement and a capacity requirement on the subcarrier for sending the data packet group; and the access network device determines, based on the quality requirement and the capacity requirement on the subcarrier for sending the data packet group, the sending occasion of the data packet group and the subcarrier for sending the data packet group.

In a possible implementation method, that the access network device receives CSI from a terminal device based on the data packet group sending interval includes: The access network device sends configuration information to the terminal device, where the configuration information includes indication information and the data packet group sending interval, and the indication information indicates that a period in which the terminal device reports the CSI is the same as the data packet group sending interval; and the access network device receives the CSI from the terminal device.

In a possible implementation method, the indication information further indicates the terminal device to report the CSI in first duration before a moment at which the data packet group arrives.

In a possible implementation method, that the access network device receives CSI from a terminal device based on the data packet group sending interval includes: The access network device determines, based on the data packet group sending interval, time when the data packet group arrives;

the access network device sends downlink control information DCI to the terminal device in second duration before a moment at which the data packet group arrives, to indicate the terminal device to report the CSI; and the access network device receives the CSI from the terminal device.

In a possible implementation method, the characteristic information includes a sending time window of the data packet group, where the sending time window of the data packet group indicates maximum sending duration for sending the data packet group. That the access network device sends the data packet group based on the characteristic information includes: When a first data packet of the data packet group fails to be initially transmitted, the access network device determines remaining sending time of the data packet group based on the sending time window of the data packet group; and when retransmission time of the first data packet is longer than the remaining sending time of the data packet group, the access network device discards the first data packet.

In a possible implementation method, the characteristic information is from an application server; the characteristic information is from a database, and the characteristic information in the database is from an application server; or the characteristic information is from the session management network element, and the characteristic information in the session management network element is from an application server.

According to a third aspect, this application provides a communication apparatus. The apparatus may be a user plane network element, or may be a chip used in the user plane network element. The apparatus has a function of implementing the first aspect or the possible implementation methods of the first aspect. The function may be implemented by hardware, or may be implemented by hardware executing corresponding software. The hardware or the software includes one or more modules corresponding to the function.

According to a fourth aspect, this application provides a communication apparatus. The apparatus may be an access network device, or may be a chip used in the access network device. The apparatus has a function of implementing the second aspect or the possible implementation methods of the second aspect. The function may be implemented by hardware, or may be implemented by hardware executing corresponding software. The hardware or the software includes one or more modules corresponding to the function.

According to a fifth aspect, an embodiment of this application provides a communication apparatus, including a processor and a memory. The memory is configured to store computer-executable instructions. When the apparatus runs, the processor executes the computer-executable instructions stored in the memory, so that the apparatus performs any method in the first aspect and the second aspect and the possible implementation methods of the first aspect and the second aspect.

According to a sixth aspect, an embodiment of this application provides a communication apparatus, including units or means configured to perform the steps in any method in the first aspect and the second aspect or the possible implementation methods of the first aspect and the second aspect.

According to a seventh aspect, an embodiment of this application provides a communication apparatus, including a processor and an interface circuit. The processor is configured to communicate with another apparatus through the interface circuit, and perform any method in the first aspect and the second aspect or the possible implementation methods of the first aspect and the second aspect. There are one or more processors.

According to an eighth aspect, an embodiment of this application provides a communication apparatus, including a processor. The processor is configured to be connected to a memory, and invoke a program stored in the memory, to perform any method in the first aspect and the second aspect or the possible implementation methods of the first aspect and the second aspect. The memory may be located inside or outside the apparatus. In addition, there are one or more processors.

According to a ninth aspect, an embodiment of this application further provides a computer-readable storage medium. The computer-readable storage medium stores instructions. When the instructions are run on a computer, a processor is enabled to perform any method in the first aspect and the second aspect or the possible implementation methods of the first aspect and the second aspect.

According to a tenth aspect, an embodiment of this application further provides a computer program product. The computer product includes a computer program. When the computer program is run, any method in the first aspect and the second aspect or the possible implementation methods of the first aspect and the second aspect are enabled to be performed.

According to an eleventh aspect, an embodiment of this application further provides a chip system, including a processor. The processor is configured to perform any method in the first aspect and the second aspect or the possible implementation methods of the first aspect and the second aspect.

According to a twelfth aspect, an embodiment of this application further provides a communication method, including: A user plane network element receives first characteristic information of a service data flow, where the first characteristic information is used to describe a characteristic of the service data flow; the user plane network element identifies a data packet group in the service data flow based on the first characteristic information of the service data flow; the user plane network element sends the data packet group to an access network device; and the access network device receives second characteristic information of the service data flow, where the second characteristic information is used to describe a characteristic of the service data flow; the access network device receives the service data flow from the user plane network element; the access network device identifies the data packet group in the service data flow; and the access network device sends the data packet group based on the second characteristic information.

According to a thirteenth aspect, an embodiment of this application further provides a communication apparatus, including: A user plane network element and an access network device. The user plane network element is configured to: receive first characteristic information of a service data flow, where the first characteristic information is used to describe a characteristic of the service data flow; identify a data packet group in the service data flow based on the first characteristic information of the service data flow; and send the data packet group to an access network device. The access network device is configured to: receive second characteristic information of the service data flow, where the second characteristic information is used to describe a characteristic of the service data flow; receive the service data flow from the user plane network element; identify the data packet group in the service data flow; and send the data packet group based on the second characteristic information.

BRIEF DESCRIPTION OF DRAWINGS

FIG. 2(*a*) is a schematic diagram of a 5G network architecture based on a service-based architecture;

FIG. 2(*b*) is a schematic diagram of a 5G network architecture based on a point-to-point interface;

DESCRIPTION OF EMBODIMENTS

To make the objective, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two.

Figures 1, 2A:
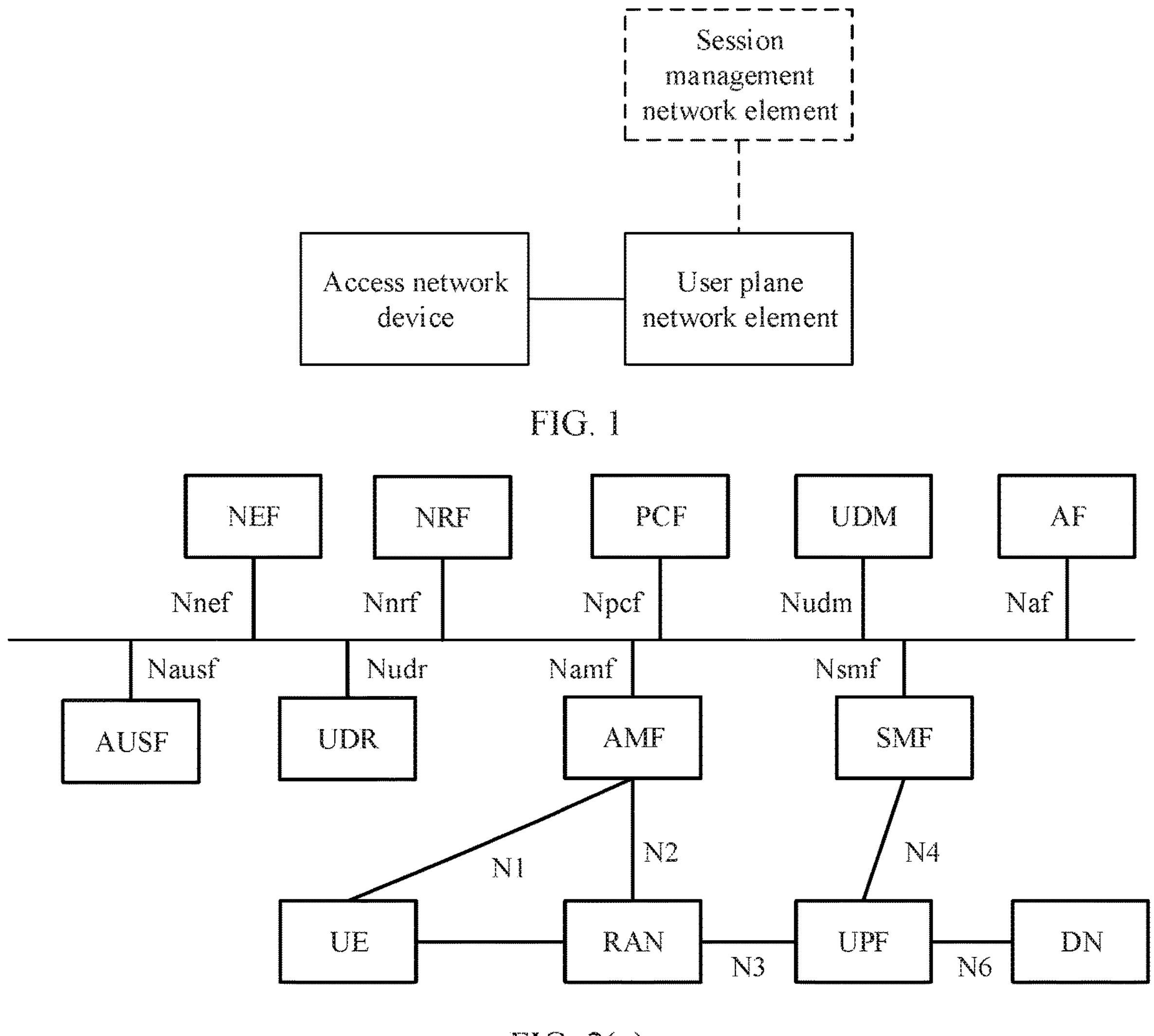
FIG. 1 is a schematic diagram of a communication system according to an embodiment of this application.

To resolve the problem mentioned in the background, as shown in FIG. 1, this application provides a communication system. The system includes an access network device and a user plane network element. Optionally, the system further includes a session management network element.

The user plane network element is configured to: receive first characteristic information of a service data flow, where the first characteristic information is used to describe a characteristic of the service data flow; identify a data packet group in the service data flow based on the first characteristic information of the service data flow; and send the data packet group to the access network device. The access network device is configured to: receive second characteristic information of the service data flow, where the second characteristic information is used to describe a characteristic of the service data flow; receive the service data flow from the user plane network element; identify the data packet group in the service data flow; and send the data packet group based on the second characteristic information.

In a possible implementation method, the first characteristic information includes a data feature of an initial packet and a feature of a tail packet of the data packet group. That the user plane network element is configured to identify a data packet group in the service data flow based on the first characteristic information of the service data flow specifically includes: identifying the initial packet of the data packet group based on the data feature of the initial packet; and identifying the tail packet of the data packet group based on the data feature of the tail packet.

In a possible implementation method, the first characteristic information includes a data packet group sending interval, and the data packet group sending interval indicates a sending time interval between two adjacent data packet groups in the service data flow. That the user plane network element is configured to identify a data packet group in the service data flow based on the first characteristic information of the service data flow specifically includes: configured to identify the data packet group in the service data flow based on the data packet group sending interval.

In a possible implementation method, the user plane network element is further configured to add a same data packet group identifier to all data packets of the data packet group.

In a possible implementation method, the user plane network element performs scheduling processing on the data packet group based on the first characteristic information.

In a possible implementation method, the first characteristic information includes a pulse peak rate and a pulse interval that correspond to the data packet group, and the pulse interval is a sending time interval between two adjacent pulses corresponding to the data packet group. That the user plane network element performs scheduling processing on the data packet group based on the first characteristic information specifically includes: configured to reduce, based on the pulse peak rate and the pulse interval that correspond to the data packet group, the pulse peak rate corresponding to the data packet group, so that a reduced pulse peak rate corresponding to the data packet group does not exceed a preconfigured maximum pulse peak rate. The maximum pulse peak rate is a maximum pulse peak rate of a single service data flow or a maximum aggregated pulse peak rate of a plurality of service data flows.

In a possible implementation method, the user plane network element is further configured to receive the maximum pulse peak rate from the session management network element.

In a possible implementation method, the first characteristic information is from an application server; the first characteristic information is from a database, and the first characteristic information in the database is from an application server; or the first characteristic information is from the session management network element, and the first characteristic information in the session management network element is from an application server.

In a possible implementation method, that the access network device is configured to identify the data packet group in the service data flow specifically includes: configured to determine that data packets that are in the service data flow and carry a same data packet group identifier belong to a same data packet group; or configured to identify the data packet group based on a data packet group sending interval, where the second characteristic information includes the data packet group sending interval, and the data packet group sending interval indicates a sending time interval between two adjacent data packet groups in the service data flow.

In a possible implementation method, that the access network device is configured to send the data packet group based on the second characteristic information specifically includes: configured to determine a scheduling policy of the data packet group based on the second characteristic information; and send the data packet group according to the scheduling policy of the data packet group.

In a possible implementation method, the second characteristic information includes a sending time window of the data packet group, and the sending time window of the data packet group indicates maximum sending duration for sending the data packet group. That the access network device is configured to determine a scheduling policy of the data packet group based on the second characteristic information specifically includes: configured to determine a plurality of time periods corresponding to the sending time window of the data packet group and scheduling policies corresponding to the plurality of time periods. A sending rate indicated by a scheduling policy corresponding to a later time period is higher than a sending rate indicated by a scheduling policy corresponding to an earlier time period. That the access network device is configured to send the data packet group according to the scheduling policy of the data packet group specifically includes: configured to send the data packet group according to the scheduling policies corresponding to the plurality of time periods.

In a possible implementation method, the second characteristic information includes the data packet group sending interval, and the data packet group sending interval indicates the sending time interval between the two adjacent data packet groups in the service data flow. The access network device is further configured to schedule a transmission resource of the data packet group based on the data packet group sending interval.

In a possible implementation method, that the access network device is configured to schedule a transmission resource of the data packet group based on the data packet group sending interval specifically includes: receiving channel state information CSI from a terminal device based on the data packet group sending interval; and determining, based on status information of one or more subcarriers indicated by the CSI, a sending occasion of the data packet group and the subcarrier for sending the data packet group. That the access network device is configured to send the data packet group based on the second characteristic information specifically includes: configured to send the data packet group based on the sending occasion of the data packet group and the subcarrier for sending the data packet group.

In a possible implementation method, the second characteristic information further includes a pulse peak rate and a pulse interval that correspond to the data packet group, and the pulse interval is a sending time interval between two adjacent pulses corresponding to the data packet group. That the access network device is configured to determine, based on status information of one or more subcarriers indicated by the CSI, a sending occasion of the data packet group and the subcarrier for sending the data packet group specifically includes: configured to determine, based on the status information of the one or more subcarriers indicated by the CSI, the pulse peak rate, and the pulse interval, a quality requirement and a capacity requirement on the subcarrier for sending the data packet group; and configured to determine, based on the quality requirement and the capacity requirement on the subcarrier for sending the data packet group, the sending occasion of the data packet group and the subcarrier for sending the data packet group.

In a possible implementation method, that the access network device is configured to receive CSI from a terminal device based on the data packet group sending interval specifically includes: configured to send configuration information to the terminal device, where the configuration information includes indication information and the data packet group sending interval, and the indication information indicates that a period in which the terminal device reports the CSI is the same as the data packet group sending interval; and configured to receive the CSI from the terminal device.

In a possible implementation method, the indication information further indicates the terminal device to report the CSI in first duration before a moment at which the data packet group arrives.

In a possible implementation method, that the access network device is configured to receive CSI from a terminal device based on the data packet group sending interval specifically includes: determining, based on the data packet group sending interval, time when the data packet group arrives; sending downlink control information DCI to the terminal device in second duration before a moment at which the data packet group arrives, to indicate the terminal device to report the CSI; and receiving the CSI from the terminal device.

In a possible implementation method, the second characteristic information includes a sending time window of the data packet group, where the sending time window of the data packet group indicates maximum sending duration for sending the data packet group. That the access network device is configured to send the data packet group based on the characteristic information specifically includes: when a first data packet of the data packet group fails to be initially transmitted, determining remaining sending time of the data packet group based on the sending time window of the data packet group; and when retransmission time of the first data packet is longer than the remaining sending time of the data packet group, discarding the first data packet.

In a possible implementation method, the second characteristic information is from an application server; the second characteristic information is from a database, and the second characteristic information in the database is from an application server; or the second characteristic information is from the session management network element, and the second characteristic information in the session management network element is from an application server.

In a possible implementation method, the session management network element is configured to: receive the first characteristic information from the database or the application server; and send the first characteristic information to the user plane network element.

In a possible implementation method, the session management network element is configured to: receive the second characteristic information from the database or the application server; and send the second characteristic information to the user plane network element.

Specific implementations of the foregoing solutions are described in detail in the following method embodiments. Details are not described herein again.

The system shown in FIG. 1 may be used in a fifth generation (5G) network architecture shown in FIG. 2(*a*) or FIG. 2(*b*), or certainly may be used in a future network architecture, for example, a sixth generation (6G) network architecture. This is not limited in this application.

For example, it is assumed that the communication system shown in FIG. 1 is used in the 5G network architecture. FIG. 2(*a*) is a schematic diagram of a 5G network architecture based on a service-based architecture. A network element or an entity corresponding to a user plane network element in FIG. 1 may be a user plane function (UPF) network element in a 5G network architecture shown in FIG. 2(*a*), and a network element or an entity corresponding to an access network device in FIG. 1 may be a radio access network (RAN) device in the 5G network architecture shown in FIG. 2(*a*). A network element or an entity corresponding to a session management network element in FIG. 1 may be a session management function (session management function, SMF) network element in the 5G network architecture shown in FIG. 2(*a*).

The 5G network architecture shown in FIG. 2(*a*) may include three parts: a terminal device, a data network (DN), and a carrier network. The following briefly describes functions of some network elements.

The carrier network may include one or more of the following network elements: an authentication server function (AUSF) network element, a network exposure function (NEF) network element, a policy control function (PCF) network element, unified data management (UDM), a unified data repository (UDR), a network repository function (NRF) network element, an application function (AF) network element, an access and mobility management function (AMF) network element, an SMF network element, a RAN, a UPF network element, and the like. In the foregoing carrier network, a part other than the radio access network may be referred to as a core network.

During specific implementation, the terminal device in embodiments of this application may be a device configured to implement a wireless communication function. The terminal device may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed location.

The terminal device may establish a connection to the carrier network through an interface (for example, N1) provided by the carrier network, and use a service such as a data service and/or a voice service provided by the carrier network. The terminal device may further access the DN through the carrier network, and use a carrier service deployed on the DN and/or a service provided by a third party. The third party may be a service provider other than the carrier network and the terminal device, and may provide another service such as a data service and/or a voice service for the terminal device. A specific representation form of the third party may be specifically determined based on an actual application scenario, and is not limited herein.

The RAN is a subnet of the carrier network, and is an implementation system between a service node in the carrier network and the terminal device. To access the carrier network, the terminal device first passes through the RAN, and then may be connected to the service node in the carrier network through the RAN. The RAN device in this application is a device that provides the wireless communication function for the terminal device, and the RAN device is also referred to as an access network device. The RAN device in this application includes but is not limited to: a next generation NodeB (gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like.

The AMF network element mainly performs functions such as mobility management and access authentication/authorization. In addition, the AMF network element is responsible for transferring a user policy between the UE and the PCF.

The SMF network element mainly performs functions such as session management, execution of a control policy delivered by the PCF, UPF selection, and UE internet protocol (IP) address assignment.

The UPF network element serves as an interface UPF connecting to the data network, and implements functions such as user plane data forwarding, charging statistics based on a session/flow level, and bandwidth throttling.

The UDM network element is mainly responsible for functions such as subscription data management and user access authorization.

The UDR is mainly responsible for a function of accessing subscription data, policy data, application data, and another type of data.

The NEF is mainly configured to support capability and event exposure.

The AF network element mainly transfers a requirement of an application side on a network side, for example, a quality of service (QoS) requirement or user status event subscription. The AF may be a third-party functional entity, or may be an operator-deployed application service, for example, an IP multimedia subsystem (IMS) voice call service. The AF network element may also be referred to as an application server.

The PCF network element is mainly responsible for policy control functions such as charging for a session level or a service data flow level, a QoS bandwidth guarantee, mobility management, and UE policy decision.

The NRF network element may be configured to provide a network element discovery function, and provide, based on a request from another network element, network element information corresponding to a network element type. The NRF further provides a network element management service, for example, registration, update, and deregistration of a network element and subscription and push of a network element status.

The AUSF network element is mainly responsible for authenticating a user, to determine whether the user or a device is allowed to access a network.

The DN is a network outside the carrier network. The carrier network may access a plurality of DNs. A plurality of services may be deployed in the DN, and the DN may provide a service such as a data service and/or a voice service for the terminal device. For example, the DN is a private network of a smart factory, a sensor installed in a workshop of the smart factory may be the terminal device, a control server of the sensor is deployed in the DN, and the control server may serve the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be the terminal device, and the mobile phone or the computer of the employee may access information, data resources, and the like in the internal office network of the company.

Nausf, Nnef, Npcf, Nudm, Naf, Namf, Nsmf, N1, N2, N3, N4, and N6 in FIG. 2(*a*) are interface serial numbers. For meanings of the interface serial numbers, refer to meanings defined in a 3GPP standard protocol. This is not limited herein.

For example, it is assumed that the communication system shown in FIG. 1 is used in the 5G network architecture. FIG. 2(*b*) is a schematic diagram of a 5G network architecture based on a point-to-point interface. A network element or an entity corresponding to the user plane network element in FIG. 1 may be a UPF network element in a 5G network architecture shown in FIG. 2(*b*), and a network element or an entity corresponding to the access network device in FIG. 1 may be a RAN device in the 5G network architecture shown in FIG. 2(*b*). A network element or an entity corresponding to the session management network element in FIG. 1 may be an SMF network element in the 5G network architecture shown in FIG. 2(*b*).

For descriptions of functions of network elements in FIG. 2(*b*), refer to the descriptions of the functions of the corresponding network elements in FIG. 2(*a*). Details are not described again. A main difference between FIG. 2(*b*) and FIG. 2(*a*) lies in that interfaces between the network elements in FIG. 2(*b*) are the point-to-point interfaces rather than service-oriented interfaces.

In the architecture shown in FIG. 2(*b*), names and functions of the interfaces between the network elements are as follows:

(1) N7 represents an interface between the PCF and the SMF, and is configured to deliver a protocol data unit (PDU) session granularity control policy and a service data flow granularity control policy.

(2) N15 represents an interface between the PCF and the AMF, and is configured to deliver a UE policy and an access control related policy.

(3) N5 represents an interface between the AF and the PCF, and is configured to deliver an application service request, and report a network event.

(4) N4 represents an interface between the SMF and the UPF, and is configured to transfer information between a control plane and a user plane, including delivery of a forwarding rule, a QoS control rule, a traffic statistics rule, and the like from the control plane to the user plane, and reporting of user plane information.

(5) N11 represents an interface between the SMF and the AMF, and is configured to: transfer PDU session tunnel information between the RAN and the UPF, transfer a control message to be sent to UE, transfer radio resource control information to be sent to the RAN, and so on.

(6) N2 represents an interface between the AMF and the RAN, and is configured to transfer radio bearer control information from a core network side to the RAN, and so on.

(7) N1 represents an interface between the AMF and the UE, is access-irrelevant, and is configured to transfer a QoS control rule to the UE, and so on.

(8) N8 represents an interface between the AMF and the UDM, and is used by the AMF to obtain access and mobility management related subscription data and authentication data from the UDM, used by the AMF to register current mobility management related information of the UE with the UDM, and so on.

(9) N10 represents an interface between the SMF and the UDM, and is used by the SMF to obtain session management related subscription data from the UDM, used by the SMF to register current session related information of the UE with the UDM, and so on.

(10) N35 represents an interface between the UDM and the UDR, and is used by the UDM to obtain user subscription data information from the UDR.

(11) N36 represents an interface between the PCF and the UDR, and is used by the PCF to obtain policy related subscription data and application data related information from the UDR.

(12) N12 represents an interface between the AMF and the AUSF, and is used by the AMF to initiate an authentication procedure to the AUSF, where an SUCI may be carried as a subscription identifier.

(13) N13 represents an interface between the UDM and the AUSF, and is used by the AUSF to obtain a user authentication vector from the UDM, to perform the authentication procedure.

It may be understood that the foregoing network elements or the functions may be network elements in a hardware device, software functions running on dedicated hardware, or virtualized functions instantiated on a platform (for example, a cloud platform). Optionally, the foregoing network elements or the functions may be implemented by one device, may be jointly implemented by a plurality of devices, or may be implemented by one functional module in one device. This is not specifically limited in embodiments of this application.

A session management network element, a policy control network element, a user plane network element, and an access network device in this application may be respectively the SMF, the PCF, the UPF, and the RAN in FIG. 2(*a*) or FIG. 2(*b*), or may be network elements that have the functions of the SMF, the PCF, the UPF, and the RAN in future communication, for example, a 6G network. This is not limited in this application. For ease of description, in this application, descriptions are provided by using an example in which the session management network element, the policy control network element, the user plane network element, and the access network device are respectively the SMF, the PCF, the UPF, and RAN.

In an existing QoS model, when the UPF receives a downlink data packet, the UPF encapsulates data packets having a same reliability requirement into a same QoS flow by using a filter in a packet detection rule (PDR) preconfigured by the SMF. A plurality of QoS flows may exist in a same PDU session, but each QoS flow has an independent and unique QoS flow identifier (QFI), and each QoS flow is associated with one QoS profile. The network side uses, based on parameters in the QoS profile, a same QoS guarantee, such as a delay, a forwarding priority, and a packet loss rate, for data packets belonging to a same QoS flow.

When the RAN receives downlink QoS flows from the UPF, the RAN encapsulates several QoS flows into a same data radio bearer (DRB) according to a specific mapping rule (where no detailed rule is currently defined in a standard). A same DRB is subject to same reliability assurance on an air interface side.

Currently, in some scenarios such as AR, VR, and a tactile network, a requirement for real-time performance of data transmission is high. To be specific, a specific amount of data needs to be sent in a short transmission time window. When a requirement for real-time performance is high, how to implement appropriate control on data that needs to be sent to improve efficiency of data transmission is a problem that urgently needs to be resolved currently.

Problems related to efficiency of data transmission mainly include:

Problem (1): In a sending time window of a data packet group, different data packets of the data packet group can be sent in different scheduling delays, and scheduling space of an earlier data packet of the data packet group is larger than scheduling space of a later data packet of the data packet group. As a result, a probability of a packet loss of the later data packet of the data packet group is higher.

For example, when the earlier data packet of the data packet group fails to be sent, data may be retransmitted. When the later data packet of the data packet group fails to be sent, because a sending time window of the data packet group is close to an end, and remaining transmission time is short, data that fails to be sent may not be retransmitted. In addition, because the earlier data packet of the data packet group may occupy a large part of a sending period, sending time of the later data packet of the data packet group is short. This causes a problem of a loss of more data packets.

Problem (2): In a sending time window of a data packet group, one data packet retransmission in the data packet group occupies extra delay overheads. As a result, transmission time of a subsequent data packet of the data packet group may exceed the sending time window. In this case, there is no corresponding solution to how to process the data packet whose transmission time exceeds the sending time window.

Problem (3): In some cases, sending of a service data flow may have a problem that an instantaneous peak rate increases and a preset maximum peak rate is exceeded. This causes a data packet loss problem.

Problem (4): A current data packet is transmitted based on a QoS flow, and data packets in a same QoS flow may be from a plurality of service data flows or from different data packet groups in a same service data flow. As a result, a receiving side cannot distinguish an association relationship between different data packets in the QoS flow. This affects receiving efficiency of the receiving side.

In embodiments of this application, the foregoing four problems that affect efficiency of data transmission are resolved.

In embodiments of this application, service data flow information includes one or more of an application identifier (App ID), identification information of a service data flow, a QoS requirement of a service data flow, or characteristic information (Traffic model) of a service data flow.

The application identifier is used to identify a specific service, for example, may be a specified character.

The identification information of the service data flow includes but is not limited to one or both of the following information: an IP triplet and a uniform resource locator (URL). The IP triplet refers to an IP address, a port number, and a protocol number of an application server (namely, an AF).

The QoS requirement of the service data flow includes but is not limited to one or more of the following information: a bit rate, a packet loss rate (PER), and a delay.

The characteristic information of the service data flow is used to describe a characteristic of the service data flow.

For a service data flow of a burst type, the characteristic information of the service data flow includes but is not limited to one or more of the following information:

(1) Data Feature of an Initial Packet of a Data Packet Group

For example, the data feature of the initial packet may be a specified size of the initial packet, so that a receiving side may identify, based on the specified size of the initial packet, that a data packet is the initial packet of the data packet group, that is, identify a start location of the data packet group. For example, if the data feature of the initial packet is that the size of the initial packet is x, when the receiving side receives a data packet whose size is x, it is determined that the data packet is the initial packet of the data packet group.

(2) Data Feature of a Tail Packet of a Data Packet Group

For example, the data feature of the tail packet may be a specified size of the tail packet, so that a receiving side may identify, based on the specified size of the tail packet, that a data packet is the tail packet of the data packet group, that is, identify an end location of the data packet group. For example, if the data feature of the tail packet is that the size of the tail packet is y, when the receiving side receives a data packet whose size is y, it is determined that the data packet is the tail packet of the data packet group.

For another example, the data feature of the tail packet may alternatively be a specified size of two consecutive data packets, so that after continuously receiving two data packets of the specified size, the receiving side determines that the 2$^{nd}$ data packet in the two consecutive data packets is the tail packet of the data packet group, that is, identifies an end location of the data packet group. In an example, the data feature of the tail packet is that sizes of the two consecutive data packets are z. When the receiving side continuously receives two data packets whose sizes are both z, it is determined that the 2$^{nd}$ data packet in the two consecutive data packets is the tail packet of the data packet group.

(3) Sending Time Window of a Data Packet Group

The sending time window of the data packet group specifies maximum duration for sending a data packet of the data packet group. Alternatively, this is understood as that a data packet of a data packet group needs to be sent in a sending time window. If the sending time window is exceeded, the data packet of the data packet group cannot be sent, that is, the data packet needs to be discarded.

(4) Data Packet Group Sending Interval

The data packet group sending interval refers to a sending interval between two data packet groups, namely, a time interval between an initial packet of a data packet group and an initial packet of a next data packet group. Alternatively, this is understood as that the data packet group sending interval indicates a sending time interval between two adjacent data packet groups in a service data flow.

(5) Quantity of Pulses Corresponding to a Data Packet Group

When an amount of data transmitted in a data packet group is large, the data packet group may be sent for a plurality of times, that is, sent by using a plurality of pulses. A quantity of pulses corresponding to the data packet group is a quantity of sending times of the data packet group, or a quantity of pulses for sending the data packet group.

(6) Pulse Peak Rate Corresponding to a Data Packet Group

For example, to send the data packet group more quickly in shortest time, a 4× transmission control protocol (TCP) sending rate may be used for sending. In this case, the pulse peak rate corresponding to the data packet group=a sending rate*4/1000 ms. For example, when the sending rate is set to 120 Mb/s, the pulse peak rate corresponding to the data packet group is 0.48 Mb/ms.

(7) Pulse Interval

When an amount of data in a data packet group is large, the data packet group may be sent for a plurality of times, that is, sent by using a plurality of pulses. In addition, a specific time interval, namely, a pulse interval, needs to exist between two pulses. That is, the pulse interval is a sending time interval between two adjacent pulses corresponding to the data packet group.

In embodiments of this application, one data packet group in a service data flow may be a group of data packets corresponding to one video frame of a media service, may be a group of data packets generated by one tactile and action sensing operation, or the like.

Figures 2B, 3:
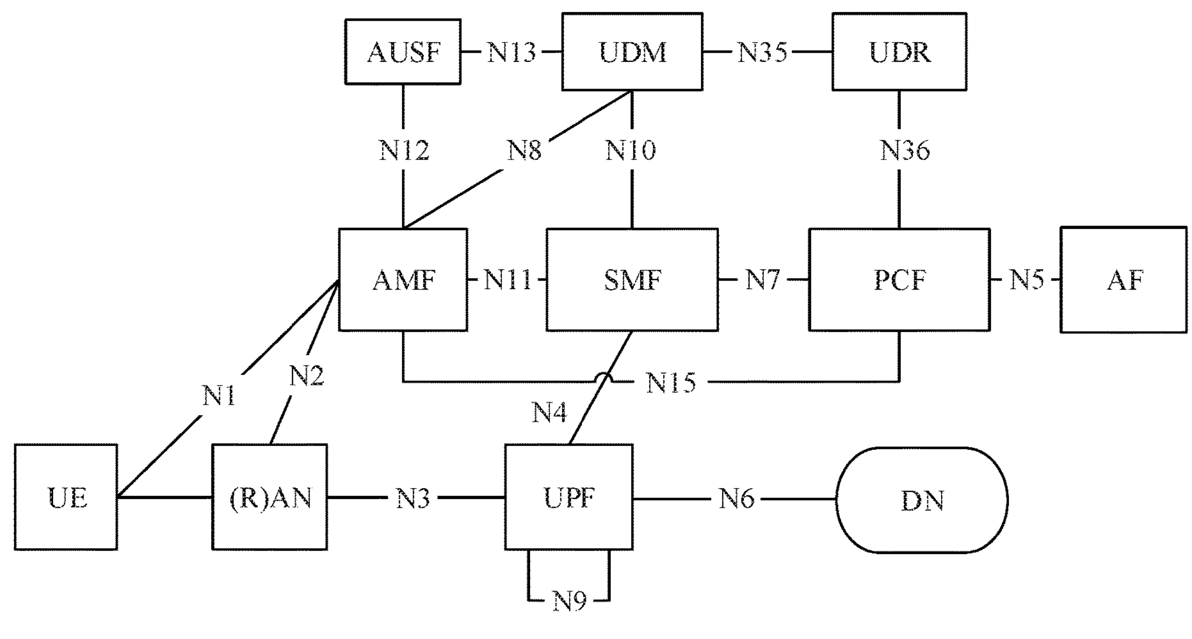
FIG. 3 is a schematic diagram of a traffic model of a service data flow of a burst type in cloud VR.

The following describes a service data flow of a burst type with reference to a specific example. For example, in a cloud VR scenario, a cloud server performs rendering to generate a corresponding VR video based on perception data such as a head action and an angle of view of a user, encodes the VR video, and then sends an encoded video to a VR terminal by using a 5G network. FIG. 3 is a schematic diagram of a traffic model of a service data flow of a burst type in cloud VR. In this example, one “video frame” corresponds to one “data packet group”.

A video stream in cloud VR has the following characteristics:

(1) A video stream sent by a cloud server to a VR terminal is sent in a form of a pulse, each pulse wave is a video frame, and each video frame has approximately 150 data packets. A frame rate is 60 frames per second (FPS), and a video frame sending interval=1000 ms/60 FPS=16.7 ms.

(2) To ensure continuity of watching by a user, all data packets in a video frame need to be transmitted to a VR terminal within 8.3 ms, so that the VR terminal can decode the received data packet and perform video presentation. Herein, 8.3 ms is a sending time window of the video frame.

(3) To send a video frame more quickly in shortest time, a 4x transmission control protocol TCP sending rate (SendSpeed) may be used for sending. A pulse peak rate corresponding to a video frame=a sending rate*4/1000 ms. For example, when the sending rate is set to 120 Mb/s, the pulse peak rate corresponding to the video frame is 0.48 Mb/ms.

(4) When a large amount of data is transmitted in a video frame, the video frame may be divided into a plurality of pulses for sending. For example, a pulse interval between two pulses is 4 ms.

(5) A quantity of pulses corresponding to a video frame ROUNDUP(bitrate/FPS/(SendSpeed*4/1000)), where bitrate indicates a bit rate, FPS indicates a frame rate, SendSpeed indicates a sending rate, and a ROUNDUP (x) function indicates that x is rounded up to an integer. For example, when bitrate is 50 Mb/s, FPS is 60, and SendSpeed is 120 Mb/s, the quantity of pulses corresponding to the video frame is 2.

For a service data flow of a rate average type, characteristic information of the service data flow includes but is not limited to one or more of the following information:

(1) to (4) are the same as (1) to (4) in the characteristic information of the service data flow of the burst type.

(5) Service data flow rate

The service data flow rate is an average sending rate.

Figure 4:
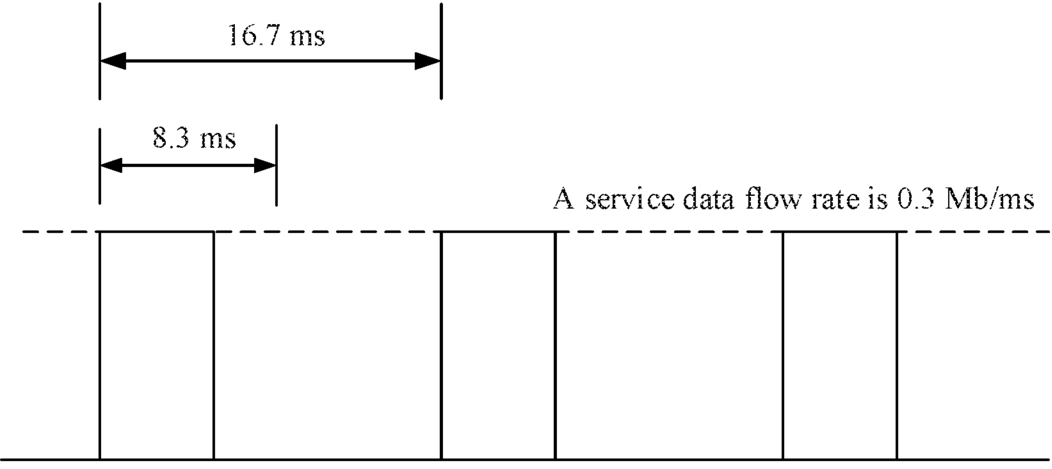
FIG. 4 is a schematic diagram of a traffic model of a service data flow of a rate average type.

The following describes the service data flow of the rate average type with reference to a specific example. FIG. 4 is a schematic diagram of a traffic model of a service data flow of a rate average type. A video frame sending interval=16.7 ms, a video frame sending time window=8.3 ms, and a service data flow rate=0.3 Mb/ms.

Figure 5:
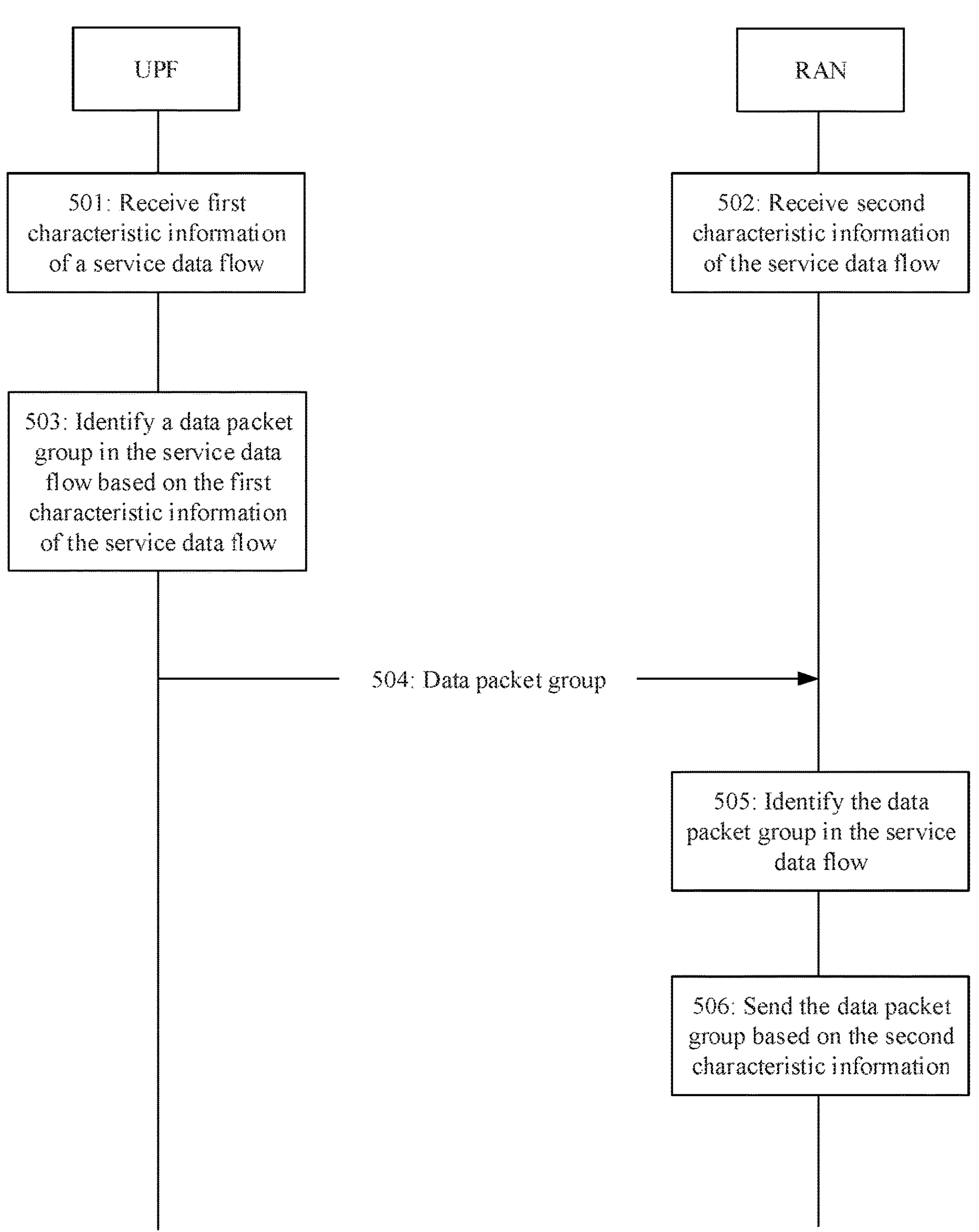
FIG. 5 is a schematic flowchart of a communication method according to an embodiment of this application.

To implement appropriate control on data that needs to be sent, to improve efficiency of data transmission, embodiments of this application provide a communication method based on the architecture shown in FIG. 2(*a*) or FIG. 2(*b*). As shown in FIG. 5, the method includes the following steps.

Step 501: A UPF receives first characteristic information of a service data flow, where the first characteristic information is used to describe a characteristic of the service data flow.

For example, the UPF may receive the first characteristic information of the service data flow from an SMF, and the first characteristic information in the SMF may be from a database (for example, a UDR), a NEF, or an application server. For another example, the UPF may receive the first characteristic information of the service data flow from a database (for example, a UDR), and the first characteristic information in the database may be from an application server. For another example, the UPF may receive the first characteristic information of the service data flow from an application server.

When the service data flow is a service data flow of a burst type, the first characteristic information includes but is not limited to one or more of the following: a data feature of an initial packet of a data packet group, a data feature of a tail packet of a data packet group, a sending time window of a data packet group, a data packet group sending interval, a quantity of pulses corresponding to a data packet group, or a pulse peak rate and a pulse interval that correspond to a data packet group.

When the service data flow is a service data flow of a rate average type, the first characteristic information includes but is not limited to one or more of the following: a data feature of an initial packet of a data packet group, a data feature of a tail packet of a data packet group, a sending time window of a data packet group, a data packet group sending interval, or a service data flow rate.

Step 502: A RAN receives second characteristic information of the service data flow, where the second characteristic information is used to describe a characteristic of the service data flow.

For example, the RAN may receive the second characteristic information of the service data flow from an SMF, and the second characteristic information in the SMF may be from a database (for example, a UDR), a NEF, or an application server. For another example, the RAN may receive the second characteristic information of the service data flow from a database (for example, a UDR), and the second characteristic information in the database may be from an application server. For another example, the RAN may receive the second characteristic information of the service data flow from an application server.

When the service data flow is a service data flow of a burst type, the second characteristic information includes but is not limited to one or more of the following: a data feature of an initial packet of a data packet group, a data feature of a tail packet of a data packet group, a sending time window of a data packet group, a data packet group sending interval, a quantity of pulses corresponding to a data packet group, or a pulse peak rate and a pulse interval that correspond to a data packet group.

When the service data flow is a service data flow of a rate average type, the second characteristic information includes but is not limited to one or more of the following: a data feature of an initial packet of a data packet group, a data feature of a tail packet of a data packet group, a sending time window of a data packet group, a data packet group sending interval, or a service data flow rate.

Step 503: The UPF identifies a data packet group in the service data flow based on the first characteristic information of the service data flow.

In other words, the service data flow is sent to the UPF in a form of a data packet group.

The UPF may identify each data packet group in the service data flow according to the following methods:

Method 1: The UPF identifies an initial packet of the data packet group based on a data feature of the initial packet, and identifies a tail packet of the data packet group based on a data feature of the tail packet.

For example, when the first characteristic information received by the UPF includes the data feature of the initial packet and the data feature of the tail packet of the service data flow, the UPF may identify the initial packet and the tail packet of each data packet group based on the data feature of the initial packet and the data feature of the tail packet of the service data flow. The initial packet, the tail packet, and a data packet between the initial packet and the tail packet belong to one data packet group. Therefore, the UPF can identify each data packet group.

Method 2: The UPF identifies the data packet group in the service data flow based on a data packet group sending interval.

For example, when the first characteristic information received by the UPF includes the data packet group sending interval, the UPF may identify the $1^{st}$ data packet group in the service data flow according to the foregoing Method 1, and for a data packet group after the $1^{st}$ data packet group, the foregoing Method 1 or Method 2 may be used for identification.

In an implementation method, after identifying each data packet group in the service data flow, the UPF may add a same data packet group identifier to all data packets of a same data packet group. For example, a data packet group identifier K is added to a header of each data packet of an $N^{th}$ data packet group, a data packet group identifier K+1 is added to a header of each data packet of an $(N+1)^{th}$ data packet group, a data packet group identifier K+2 is added to a header of each data packet of an $(N+2)^{th}$ data packet group, and so on. After labeling data packets of a same data packet group with a same data packet group identifier, the RAN may identify the data packet group based on the data packet group identifier. Based on the implementation method, the foregoing mentioned problem (4) can be resolved, to improve efficiency of data transmission.

In an implementation method, before or after the UPF adds the same data packet group identifier to the data packets of the data packet group, the UPF may further perform scheduling processing on the data packet group based on an actual requirement and the first characteristic information, for example, may perform traffic shaping on the received service data flow. For example, when the first characteristic information received by the UPF includes a quantity of pulses corresponding to the data packet group, or a pulse peak rate and a pulse interval that correspond to the data packet group, the UPF may reduce, based on the quantity of pulses corresponding to the data packet group, or the pulse peak rate and the pulse interval that correspond to the data packet group, the pulse peak rate corresponding to the data packet group, so that a reduced pulse peak rate corresponding to the data packet group does not exceed a preconfigured maximum pulse peak rate. The maximum pulse peak rate is a maximum pulse peak rate of a single service data flow or a maximum aggregated pulse peak rate of a plurality of service data flows. For another example, when the first characteristic information received by the UPF includes a pulse peak rate and a pulse interval that correspond to the data packet group, the UPF may reduce, based on the pulse peak rate and the pulse interval that correspond to the data packet group, the pulse peak rate corresponding to the data packet group, so that a reduced pulse peak rate corresponding to the data packet group does not exceed a preconfigured maximum pulse peak rate. The maximum pulse peak rate is a maximum pulse peak rate of a single service data flow or a maximum aggregated pulse peak rate of a plurality of service data flows. Optionally, the maximum pulse peak rate may be received by the UPF from the session management network element. Based on the implementation method, the foregoing mentioned problem (3) can be resolved, to improve efficiency of data transmission.

Figures 6, 7:
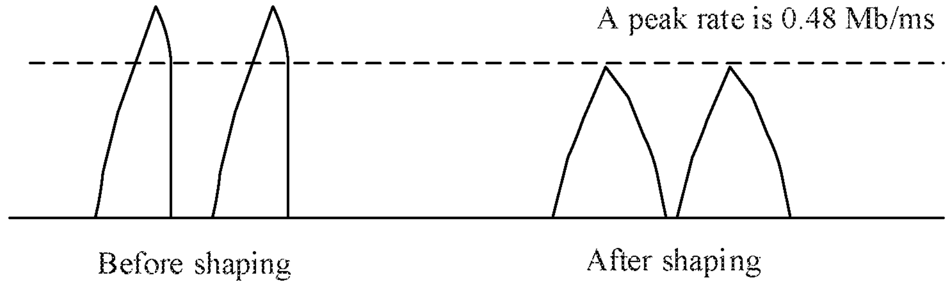
FIG. 6 is a schematic diagram of performing traffic shaping on a single service data flow of a burst type.
FIG. 7 is a schematic diagram of performing traffic shaping on two service data flows of a burst type.

FIG. 6 is a schematic diagram of performing traffic shaping on a single service data flow of a burst type. A traffic shaping method is mainly used to reduce a transmission rate by increasing a transmission delay, so that the pulse of the data packet group is lower than the preconfigured maximum pulse peak rate. It can be learned that, before traffic shaping, pulse peak rates of two pulses of a data packet group both exceed the preconfigured maximum pulse peak rate, and the maximum pulse peak rate is a maximum pulse peak rate of a single service data flow. After the traffic shaping, pulse peak rates of the two pulses of the data packet group are both lower than the preconfigured maximum pulse peak rate.

FIG. 7 is a schematic diagram of performing traffic shaping on two service data flows of a burst type. A traffic shaping method is mainly used to reduce a transmission rate of a single service data flow by increasing a transmission delay of the single service data flow, and/or send pulses of two service data flows in a staggered manner, so that a pulse peak rate of aggregated traffic of the two service data flows is lower than the preconfigured maximum pulse peak rate, where the maximum pulse peak rate is a maximum aggregated pulse peak rate of a plurality of service data flows. It can be learned that, before traffic shaping, pulses of two data packet groups are superimposed on a peak value, and a pulse peak rate of aggregated traffic of the data packet groups in two service data flows is higher than the preconfigured maximum pulse peak rate. After the traffic shaping, pulses of the two data packet groups are staggered on a peak value, and a pulse peak rate of the aggregated traffic of the data packet groups in the two service data flows is lower than the preconfigured maximum pulse peak rate. It should be noted that a traffic shaping method for three or more service data flows of the burst type is similar to the traffic shaping method for the two service data flows of the burst type. Details are not described again.

It should be noted that the foregoing describes the traffic shaping method for the service data flow of the burst type. For a service data flow of a rate average type, a traffic shaping method may be: When the first characteristic information received by the UPF includes a service data flow rate, the UPF may reduce, based on the service data flow rate, a service data flow rate corresponding to the data packet group, so that a reduced service data flow rate corresponding to the data packet group does not exceed a preconfigured maximum service data flow rate. The service data flow rate is a maximum service data flow rate of a single service data flow or a maximum aggregated service data flow rate of a plurality of service data flows. Optionally, the maximum service data flow rate may be received by the UPF from the session management network element.

According to the foregoing method, the UPF may label the data packet group (to be specific, add a data packet group identifier) and/or perform traffic shaping on the data packet group, and send, to the RAN, the labeled data packet group and/or the data packet group on which traffic shaping is performed.

Step 504: The UPF sends the data packet group to the RAN. Correspondingly, the RAN may receive the data packet group.

Step 505: The RAN identifies the data packet group in the service data flow.

When the UPF sends the service data flow to the RAN in a form of a data packet group, the RAN also needs to identify the data packet group in the service data flow.

The RAN may identify each data packet group in the service data flow according to the following methods:

Method 1: The RAN identifies each data packet group based on a data packet group identifier.

For example, when the UPF adds a same data packet group identifier to data packets of a same data packet group, and data packet group identifiers of different data packet groups are different, the RAN may identify each data packet group based on the data packet group identifier.

Method 2: The RAN identifies the data packet group in the service data flow based on a data packet group sending interval.

For example, when the second characteristic information received by the RAN includes the data packet group sending interval, the RAN may identify the 1st data packet group in the service data flow according to the foregoing Method 1, and for a data packet group after the Pt data packet group, the foregoing Method 1 or Method 2 may be used for identification.

Step 506: The RAN sends the data packet group based on the second characteristic information.

In an implementation method, when the RAN sends the data packet group to a terminal device, the RAN may determine a scheduling policy of the data packet group based on the second characteristic information, and then send the data packet group according to the scheduling policy of the data packet group. For example, when the second characteristic information received by the RAN includes a sending time window of the data packet group, that the RAN determines a scheduling policy of the data packet group based on the second characteristic information includes: The RAN determines a plurality of time periods corresponding to the sending time window of the data packet group and scheduling policies corresponding to the plurality of time periods. A sending rate indicated by a scheduling policy corresponding to a later time period is higher than a sending rate indicated by a scheduling policy corresponding to an earlier time period. That the RAN sends the data packet group according to the scheduling policy of the data packet group includes: The RAN sends the data packet group according to the scheduling policies corresponding to the plurality of time periods. According to the method, a sending rate of a later data packet of the sending time window of the data packet group can be increased, so that sending of the data packet group can be completed within one time window, to help avoid a packet loss problem. For example, the sending time window of the data packet group is divided into two time periods, where a modulation and coding scheme (MCS)-16 is used in the earlier time period, and an MSC-24 is used in the later time period. Based on the implementation method, the foregoing mentioned problem (1) can be resolved, to improve efficiency of data transmission.

In an implementation method, when the RAN sends the data packet group to the terminal device, the second characteristic information received by the RAN includes the sending time window of the data packet group, and a first data packet of the data packet group fails to be initially transmitted, the RAN determines remaining sending time of the data packet group based on the sending time window of the data packet group. When retransmission time of the first data packet is longer than the remaining sending time of the data packet group, the RAN discards the first data packet. Based on the implementation method, the foregoing mentioned problem (2) can be resolved, to improve efficiency of data transmission.

In an implementation method, when sending the data packet group to the terminal device, the RAN may further schedule a transmission resource of the data packet group based on the data packet group sending interval. For example, the RAN may predetermine a sending occasion and a subcarrier for sending the data packet group, and further send the data packet group to the terminal device based on the sending occasion of the data packet group and the subcarrier for sending the data packet group. For example, the RAN may receive channel state information (CSI) from the terminal device based on the data packet group sending interval, and then determine, based on status information of one or more subcarriers indicated by the CSI, the sending occasion of the data packet group and the subcarrier for sending the data packet group. For example, if the second characteristic information received by the RAN includes a pulse peak rate and a pulse interval that correspond to the data packet group, the RAN may determine, based on the status information of the one or more subcarriers indicated by the CSI, the pulse peak rate, and the pulse interval, a quality requirement and a capacity requirement on the subcarrier for sending the data packet group, and then determine, based on the quality requirement and the capacity requirement on the subcarrier for sending the data packet group, the sending occasion of the data packet group and the subcarrier for sending the data packet group.

Methods in which the RAN may receive the CSI from the terminal device based on the data packet group sending interval include but are not limited to the following Method 1 to Method 3.

Method 1: The RAN sends configuration information to the terminal device, where the configuration information includes indication information and the data packet group sending interval, and the indication information indicates that a period in which the terminal device reports the CSI is the same as the data packet group sending interval; and the RAN receives the CSI from the terminal device.

In other words, the RAN indicates the terminal device to periodically report the CSI to the RAN, and the period in which the terminal device reports the CSI is equal to the data packet group sending interval.

Method 2: The RAN sends configuration information to the terminal device, where the configuration information includes indication information and the data packet group sending interval, and the indication information indicates that a period in which the terminal device reports the CSI is the same as the data packet group sending interval and indicates the terminal device to report the CSI in first duration before a moment at which the data packet group arrives; and the RAN receives the CSI from the terminal device.

In other words, the RAN indicates the terminal device to periodically report the CSI to the RAN, and the period in which the terminal device reports the CSI is equal to the data packet group sending interval. In addition, time when the terminal device reports the CSI is the first duration earlier than time when the terminal device receives the data packet group from the RAN. Therefore, the RAN may determine, based on the received CSI, the sending occasion and the subcarrier occupied by the data packet group to be sent subsequently.

Method 3: The RAN determines, based on the data packet group sending interval, time when the data packet group arrives; the RAN sends downlink control information (DCI) to the terminal device in second duration before a moment at which the data packet group arrives, to indicate the terminal device to report the CSI; and the RAN receives the CSI from the terminal device.

To be specific, the RAN sends the DCI to the terminal device in the second duration before receiving the data packet group from the UPF, to indicate the terminal device to report the CSI, so that the RAN can determine, based on the received CSI, the sending occasion and the subcarrier occupied by the data packet group to be sent subsequently.

Based on the foregoing embodiment, the data packet group in the service data flow may be identified based on the pre-obtained characteristic information of the service data flow, or the service data flow may be sent based on the characteristic information of the service data flow, to improve transmission efficiency of the service data flow. Further, the UPF may further add a same data packet group identifier to data packets of a same data packet group, and may further perform traffic shaping, to reduce pressure of a high-rate service on network transmission, and further achieve efficiency of data transmission. Further, the RAN may implement different scheduling policies for different time periods in a same sending time window, to ensure that one data packet group can be completely sent in one sending time window, and ensure reliable transmission of the service data flow.

In an example, the following describes the embodiment shown in FIG. 5 with reference to specific embodiments.

Figure 8:
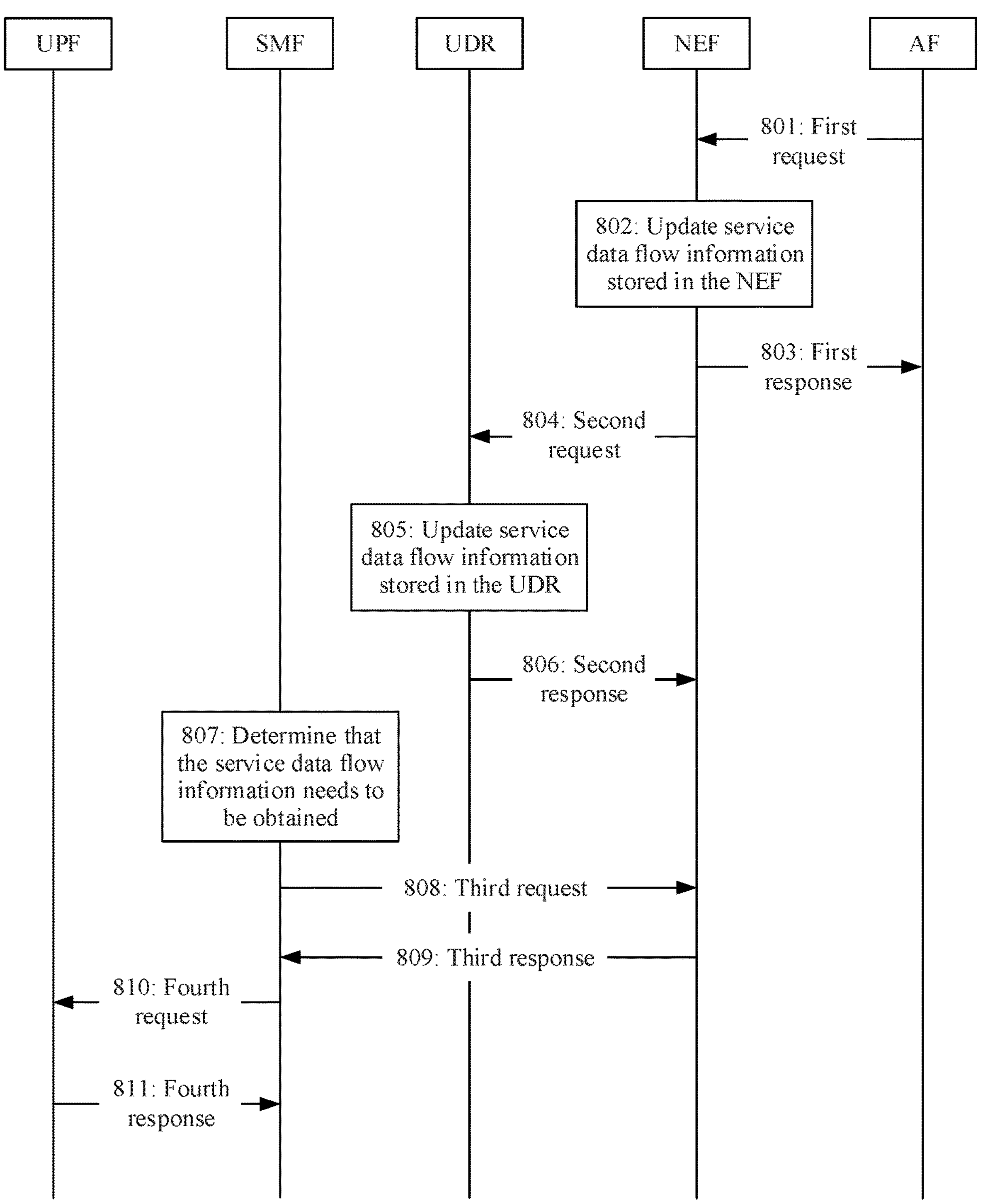
FIG. 8 is another schematic flowchart of a communication method according to an embodiment of this application.

FIG. 8 is another schematic flowchart of a communication method according to an embodiment of this application. The method provides a process of configuring service data flow information. Specifically, an AF provides the service data flow information for a network by using a NEF. The service data flow information includes at least one of an application identifier, identification information of a service data flow, a QoS requirement of a service data flow, or characteristic information of a service data flow. For specific descriptions, refer to the foregoing descriptions.

The method includes the following steps.

Step 801: The AF sends a first request to the NEF. Correspondingly, the NEF may receive the first request.

The first request carries newly added service data flow information or updated service data flow information.

In an implementation method, when the AF prepares to add the new service data flow information, the AF sends the first request to the NEF. The first request may be a service data flow create request, for example, may be specifically PFDManagement_Create Request. The service data flow create request carries the newly added service data flow information.

In another implementation method, when the AF prepares to update existing service data flow information, the AF sends the first request to the NEF. The first request may be a service data flow update request, for example, may be specifically PFDManagement_Update Request. The service data flow update request carries the updated service data flow information.

Step 802: The NEF updates the service data flow information stored in the NEF.

For example, the NEF first determines whether the first request is allowed, and if the first request is allowed, the NEF updates the service data flow information stored in the NEF. For example, if the first request carries the newly added service data flow information, the NEF updates, based on the newly added service data flow information, the service data flow information stored in the NEF. For another example, if the first request carries the updated service data flow information, the NEF updates, based on the updated service data flow information, the service data flow information stored in the NEF.

Step 803: The NEF sends a first response to the AF. Correspondingly, the AF may receive the first response.

The first response is used to notify the AF that the request is successfully processed.

Certainly, if the NEF determines that the first request is not allowed or the NEF fails to update the service data flow information in step 802, the first response is used to notify the AF that the request fails to be processed.

The first response may be specifically a service data flow create response or a service data flow update response.

Step 804: The NEF sends a second request to a UDR. Correspondingly, the UDR may receive the second request.

The second request carries the newly added service data flow information or the updated service data flow information.

In an implementation method, when the NEF prepares to add new service data flow information, the NEF sends the second request to the UDR, where the second request may be a data management create request (DM_Create Request), and the data management create request carries the newly added service data flow information.

In another implementation method, when the NEF prepares to update the existing service data flow information, the NEF sends the second request to the UDR, where the second request may be a data management update request (DM_Update Request), and the data management update request carries the updated service data flow information.

Step 805: The UDR updates the service data flow information stored in the UDR.

For example, if the second request carries the newly added service data flow information, the UDR updates, based on the newly added service data flow information, the service data flow information stored in the UDR. For another example, if the second request carries the updated service data flow information, the UDR updates, based on the updated service data flow information, the service data flow information stored in the UDR.

Step 806: The UDR sends a second response to the NEF. Correspondingly, the NEF may receive the second response.

The second response is used to notify the NEF that the request is successfully processed.

Certainly, if the UDR fails to update the service data flow information in step 805, the second response is used to notify the NEF that the request fails to be processed.

The second response may be specifically a data management create response (DM_Create Response) or a data management update response (DM_Update Response).

Step 807: An SMF determines that the service data flow information needs to be obtained.

For example, a timer is set on the SMF, and each time specified duration expires, the SMF is triggered to obtain the service data flow information.

That an SMF determines that the service data flow information needs to be obtained may be determining that the newly added service data flow information needs to be obtained, or determining that the updated service data flow information needs to be obtained.

Step 808: The SMF sends a third request to the NEF. Correspondingly, the NEF may receive the third request.

The third request is used to request to obtain the service data flow information.

For example, the third request may be PFDManagement_Fetch Request.

Step 809: The NEF sends a third response to the SMF. Correspondingly, the SMF may receive the third response.

The third response carries the newly added service data flow information or the updated service data flow information.

For example, the third response may be PFDManagement_Fetch Response.

After receiving the newly added service data flow information or the updated service data flow information, the SMF stores the newly added service data flow information or the updated service data flow information in the SMF.

In step 807 to step 809, the SMF actively requests to obtain the service data flow information from the NEF. In another implementation method, alternatively, after receiving the newly added service data flow information or the updated service data flow information, the NEF actively reports the newly added service data flow information or the updated service data flow information to the SMF. Alternatively, in another implementation method, the SMF may actively request to obtain the service data flow information from the UDR.

Step 810: The SMF sends a fourth request to a UPF. Correspondingly, the UPF may receive the fourth request.

The fourth request carries identification information of the newly added service data flow or identification information of the updated service data flow.

For example, the fourth request may be PFDManagement Request.

The UPF may perform data flow detection based on the identification information of the newly added service data flow or the identification information of the updated service data flow, to identify a new service data flow.

In the foregoing embodiment, the AF provides the newly added service data flow information or the updated service data flow information, and updates the information to the NEF, the UDR, and the SMF in the network. In a specific implementation, the update may be performed only on one or more of the NEF, the UDR, and the SMF in the network, or may be performed on another network element in the network, for example, an AMF or a PCF.

In addition, the identification information that is of the service data flow and that is in the service data flow information is further updated to the UPF, so that the UPF may start to detect a new service data flow.

Based on the foregoing embodiment, the network may be enabled to obtain and configure specified service data flow information, so that a corresponding service data flow can be detected, and data flow transmission may be subsequently performed based on the service data flow information. However, in the conventional technology, the service data flow information cannot be provided for the network.

Figure 9:
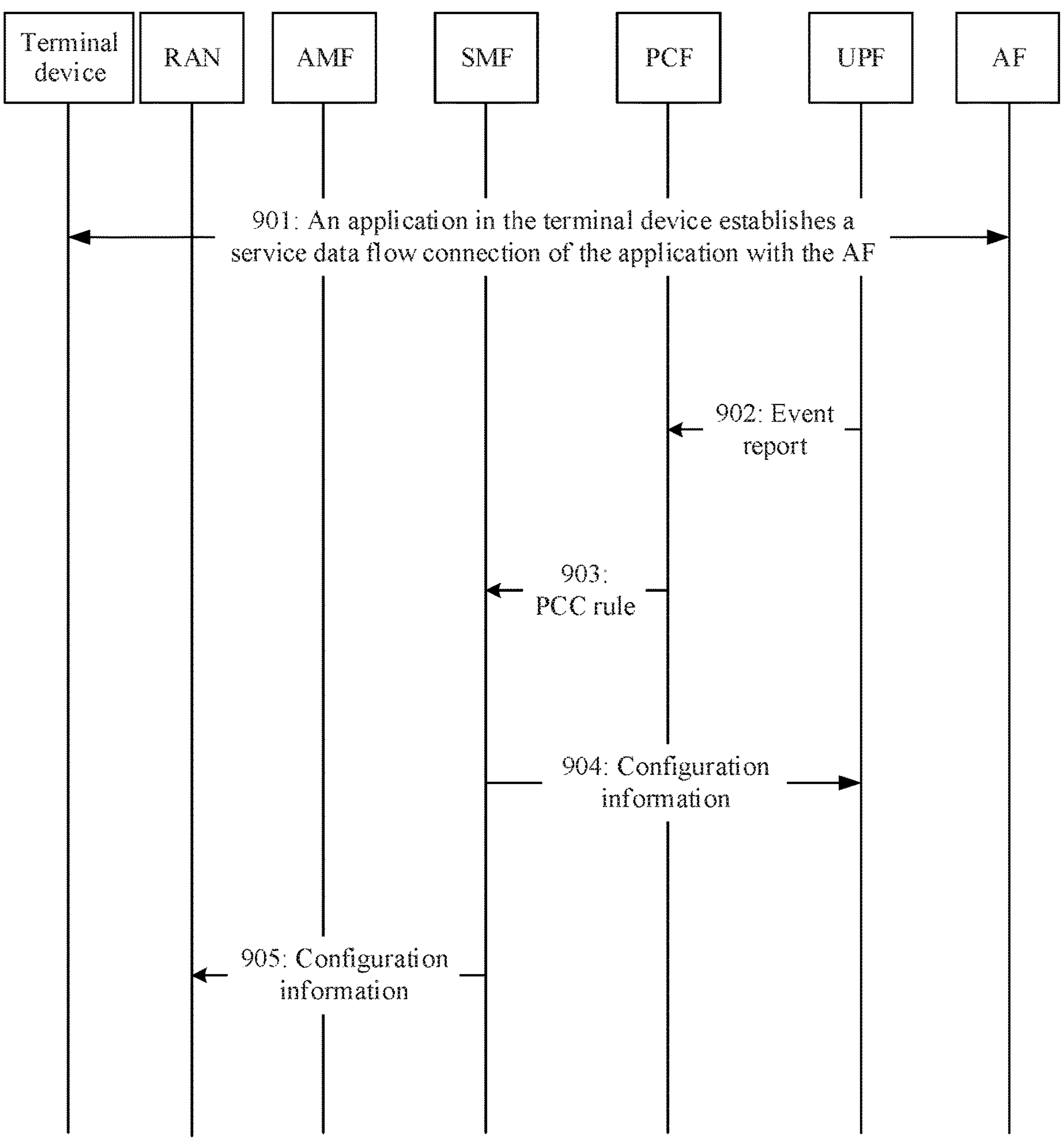
FIG. 9 is still another schematic flowchart of a communication method according to an embodiment of this application.

FIG. 9 is another schematic diagram of a communication method according to an embodiment of this application. The method provides a process of configuring characteristic information of a service data flow.

The method includes the following steps.

Step 901: An application in a terminal device establishes a service data flow connection of the application with an AF.

An IP triplet or a URL of a service data flow keeps consistent with an IP triplet or a URL in service data flow information pre-provided by the AF for a network. For example, if the AF provides the service data flow information for the network according to the method in the embodiment in FIG. 8, the IP triplet or the URL of the service data flow in step 901 is consistent with the IP triplet or the URL in the service data flow information in the embodiment in FIG. 8.

Step 902: A UPF performs packet detection according to a configured packet detection rule. When detecting a service data flow corresponding to a specified service, the UPF sends an event report to a PCF, where the event report carries a detected packet data flow description (PFD) identifier.

For example, if service data flow information corresponding to a service is preconfigured on the UPF (for example, configured through step 810 in the embodiment in FIG. 8), the UPF may use an IP triplet or a URL in the service data flow information as a parameter of the packet detection rule, to perform packet detection.

Step 903: A PCF sends a policy and charging control (PCC) rule to an SMF. Correspondingly, the SMF may receive the PCC rule.

The PCF may first obtain the service data flow information from a network element such as a UDR or an SMF, and then generate the PCC rule based on the service data flow information. When the service is transmitted by using a plurality of data flows, the PCF generates a PCC rule for each service data flow, and then the PCF sends the PCC rule to the SMF. Each PCC rule includes an application identifier, identification information of a service data flow, characteristic information of the service data flow, and a shaping policy of the service data flow, where the shaping policy includes a maximum pulse peak rate or a maximum service data flow rate.

In an implementation method, in this step, the PCF may send SMF initiated SM_Policy Association Modification Request to the SMF, where SMF initiated SM_Policy Association Modification Request carries the PCC rule.

Step 904: The SMF sends configuration information of at least one service data flow to the UPF. Correspondingly, the UPF may receive the configuration information of the at least one service data flow.

Each service data flow corresponds to one piece of configuration information, and the configuration information includes an application identifier, identification information of the service data flow, characteristic information of the service data flow, and a shaping policy of the service data flow. It should be noted that the characteristic information of the service data flow may also be referred to as first characteristic information of the service data flow. For content included in the first characteristic information of the service data flow, refer to related descriptions in the embodiment in FIG. 5. Details are not described herein again.

The SMF may send configuration information of a plurality of data flows to the UPF by using an N4 message (for example, N4 PDU Establishment Modification Request or N4 PDU Session Modification Request).

For a specific implementation method in which the UPF identifies the service data flow or performs shaping on the service data flow based on the first characteristic information of the service data flow, refer to related descriptions in the embodiment in FIG. 5. Details are not described again.

Step 905: The SMF sends the configuration information of the at least one service data flow to a RAN by using an AMF. Correspondingly, the RAN may receive the configuration information of the at least one service data flow.

Each service data flow corresponds to one piece of configuration information, and the configuration information includes an application identifier, identification information of the service data flow, and characteristic information of the service data flow. It should be noted that the characteristic information of the service data flow may also be referred to as second characteristic information of the service data flow. For content included in the second characteristic information of the service data flow, refer to related descriptions in the embodiment in FIG. 5. Details are not described herein again.

For a specific implementation method in which the RAN identifies or sends the service data flow based on the second characteristic information of the service data flow, refer to related descriptions in the embodiment in FIG. 5. Details are not described again.

Based on the foregoing embodiment, after the application in the terminal device establishes the service data flow connection of the application with the AF, the configuration information of the service data flow may be sent to the RAN and the UPF, and the RAN and the UPF perform scheduling and transmission control on the service data flow based on the configuration information, so that transmission efficiency of the service data flow can be improved.

The foregoing mainly describes the solutions provided in this application from a perspective of interaction between the network elements. It may be understood that, to implement the foregoing functions, each network element includes a corresponding hardware structure and/or software module for executing each function. A person of ordinary skill in the art should easily be aware that, in combination with the examples described in embodiments disclosed in this specification, units, algorithms and steps may be implemented by hardware or a combination of hardware and computer software in the present invention. Whether a function is executed by hardware or hardware driven by computer software depends on particular applications and design constraints of technical solutions. A person skilled in the art may use different methods to implement the described functions for each particular application, but it should not be considered that the implementation goes beyond the scope of the present invention.

It may be understood that in the foregoing method embodiments, corresponding steps or operations implemented by the access network device may alternatively be implemented by a component (for example, a chip or a circuit) configured in the access network device, and corresponding steps or operations implemented by the user plane network element may alternatively be implemented by a component (for example, a chip or a circuit) configured in the user plane network element.

Figure 10:
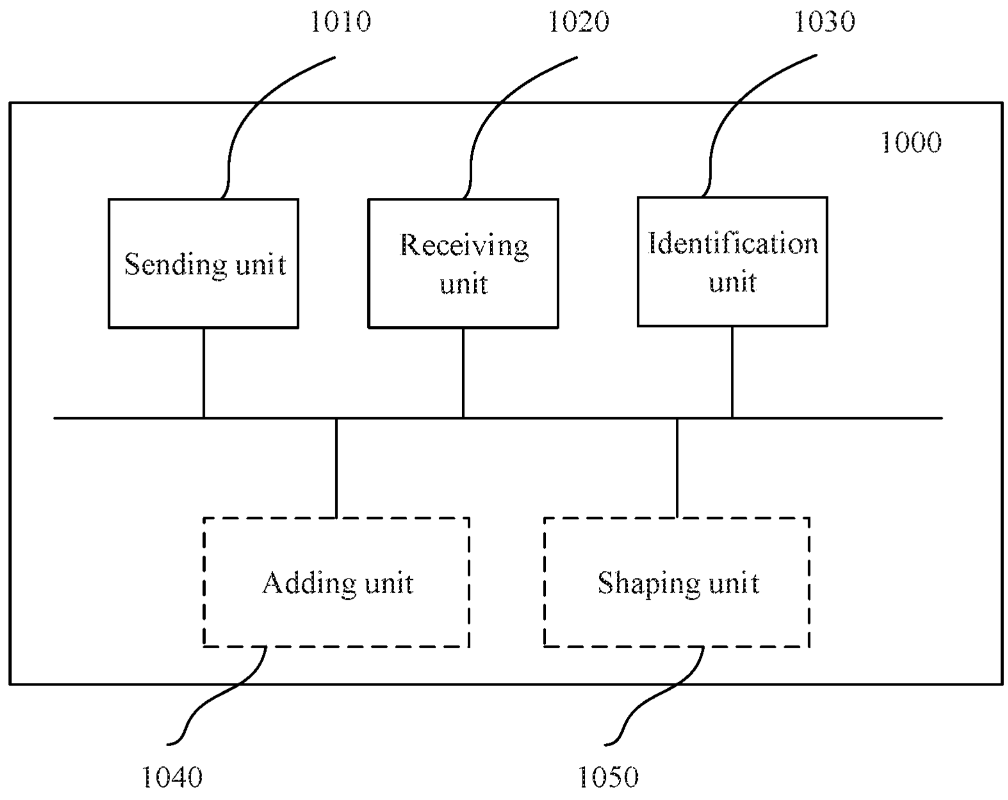
FIG. 10 is a schematic diagram of a communication apparatus according to an embodiment of this application.

FIG. 10 is a schematic diagram of a communication apparatus according to an embodiment of this application. The apparatus is configured to implement the steps performed by the corresponding user plane network element in the embodiment in FIG. 5, FIG. 8, or FIG. 9. As shown in FIG. 10, the apparatus 1000 includes a sending unit 1010, a receiving unit 1020, and an identification unit 1030. Optionally, the apparatus 1000 further includes an adding unit 1040 and a shaping unit 1050.

The receiving unit 1020 is configured to receive characteristic information of a service data flow, where the characteristic information is used to describe a characteristic of the service data flow. The identification unit 1030 is configured to identify a data packet group in the service data flow based on the characteristic information of the service data flow. The sending unit 1010 is configured to send the data packet group to an access network device.

In a possible implementation method, the characteristic information includes a data feature of an initial packet and a feature of a tail packet of the data packet group. The identification unit 1030 is specifically configured to identify the initial packet of the data packet group based on the data feature of the initial packet; and identify the tail packet of the data packet group based on the data feature of the tail packet.

In a possible implementation method, the identification unit 1030 is specifically configured to identify the data packet group in the service data flow based on a data packet group sending interval, where the characteristic information includes the data packet group sending interval, and the data packet group sending interval indicates a sending time interval between two adjacent data packet groups in the service data flow In a possible implementation method, the adding unit 1040 is configured to add a same data packet group identifier to all data packets of the data packet group.

In a possible implementation method, the shaping unit 1050 is configured to perform scheduling processing on the data packet group based on the characteristic information.

In a possible implementation method, the characteristic information includes a pulse peak rate and a pulse interval that correspond to the data packet group, and the pulse interval is a sending time interval between two adjacent pulses corresponding to the data packet group. The shaping unit 1050 is specifically configured to reduce, based on the pulse peak rate and the pulse interval that correspond to the data packet group, the pulse peak rate corresponding to the data packet group, so that a reduced pulse peak rate corresponding to the data packet group does not exceed a preconfigured maximum pulse peak rate. The maximum pulse peak rate is a maximum pulse peak rate of a single service data flow or a maximum aggregated pulse peak rate of a plurality of service data flows.

In a possible implementation method, the receiving unit 1020 is further configured to receive the maximum pulse peak rate from a session management network element.

In a possible implementation method, the characteristic information is from an application server; the characteristic information is from a database, and the characteristic information in the database is from an application server; or the characteristic information is from the session management network element, and the characteristic information in the session management network element is from an application server.

Optionally, the communication apparatus 1000 may further include a storage unit. The storage unit is configured to store data or instructions (which may also be referred to as code or a program). The foregoing units may interact with or be coupled to the storage unit, to implement a corresponding method or function. For example, the identification unit 1030, the adding unit 1040, and the shaping unit 1050 may read data or instructions in the storage unit, so that the communication apparatus implements the method in the foregoing embodiment.

It should be understood that division into the units in the apparatus is merely logical function division. During actual implementation, all or a part of the units may be integrated into one physical entity or may be physically separated. In addition, all the units in the apparatus may be implemented in a form of software invoked by a processing element, or may be implemented in a form of hardware; or a part of units may be implemented in a form of software invoked by a processing element, and a part of units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, the units may be all or partially integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of the integrated circuit forms. For another example, when the units in the apparatus may be implemented in a form of a program invoked by a processing element, the processing element may be a general-purpose processor, for example, a central processing unit (CPU) or another processor that can invoke the program. For still another example, the units may be integrated and implemented in a form of a system-on-a-chip (SoC).

The foregoing sending unit 1010 is an interface circuit of the apparatus, and is configured to send a signal to another apparatus. For example, when the apparatus is implemented by a chip, the sending unit 1010 is an interface circuit that is of the chip and that is configured to send a signal to another chip or apparatus. The foregoing receiving unit 1020 is an interface circuit of the apparatus, and is configured to receive a signal from another apparatus. For example, when the apparatus is implemented by a chip, the receiving unit 1020 is an interface circuit that is of the chip and that is configured to receive a signal from another chip or apparatus.

Figure 11:
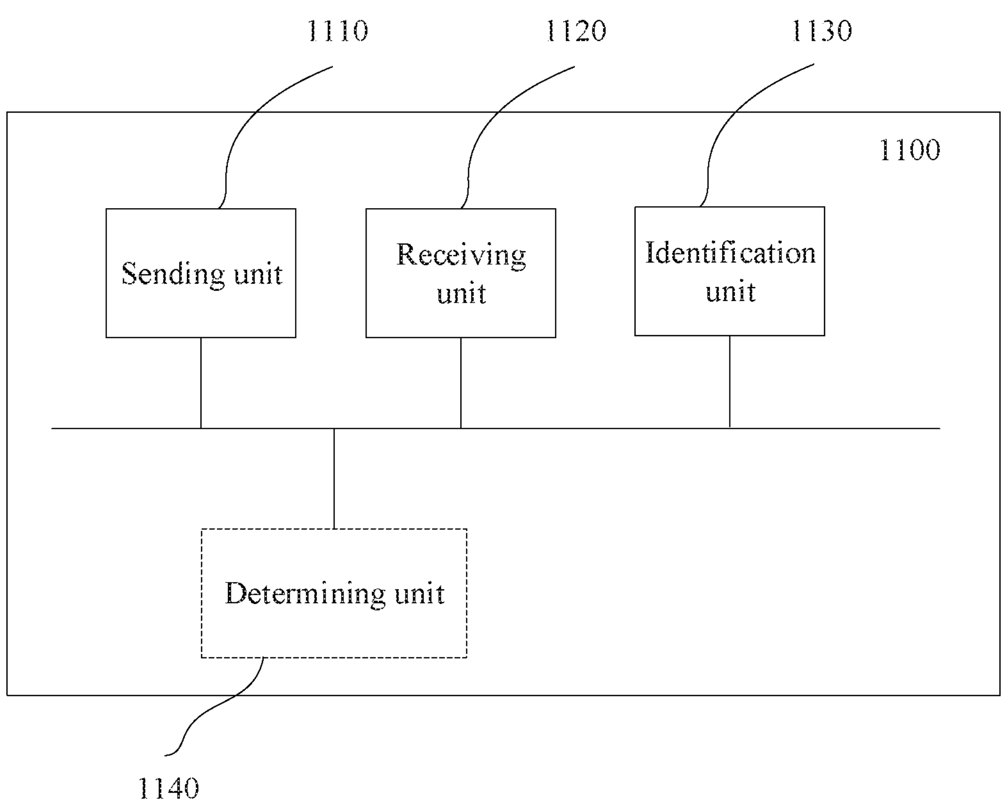
FIG. 11 is another schematic diagram of a communication apparatus according to an embodiment of this application.

FIG. 11 is another schematic diagram of a communication apparatus according to an embodiment of this application. The apparatus is configured to implement the steps performed by the corresponding access network device in the embodiment in FIG. 5, FIG. 8, or FIG. 9. As shown in FIG. 11, the apparatus 1100 includes a sending unit 1110, a receiving unit 1120, and an identification unit 1130. Optionally, the apparatus 1100 further includes a determining unit 1140.

The receiving unit 1120 is configured to: receive characteristic information of a service data flow, where the characteristic information is used to describe a characteristic of the service data flow; and receive the service data flow from a user plane network element. The identification unit 1130 is configured to identify a data packet group in the service data flow. The sending unit 1110 is configured to send the data packet group based on the characteristic information.

In a possible implementation method, the identification unit 1130 is specifically configured to: determine that data packets that are in the service data flow and carry a same data packet group identifier belong to a same data packet group; or identify the data packet group based on a data packet group sending interval, where the characteristic information includes the data packet group sending interval, and the data packet group sending interval indicates a sending time interval between two adjacent data packet groups in the service data flow.

In a possible implementation method, the sending unit 1110 is configured to: determine a scheduling policy of the data packet group based on the characteristic information; and send the data packet group according to the scheduling policy of the data packet group.

In a possible implementation method, the characteristic information includes a sending time window of the data packet group, and the sending time window of the data packet group indicates maximum sending duration for sending the data packet group. The sending unit 1110 is specifically configured to: determine a plurality of time periods corresponding to the sending time window of the data packet group and scheduling policies corresponding to the plurality of time periods. A sending rate indicated by a scheduling policy corresponding to a later time period is higher than a sending rate indicated by a scheduling policy corresponding to an earlier time period; and send the data packet group according to the scheduling policies corresponding to the plurality of time periods.

In a possible implementation method, the determining unit 1140 is configured to schedule a transmission resource of the data packet group based on the data packet group sending interval.

In a possible implementation method, the characteristic information includes the data packet group sending interval, and the data packet group sending interval indicates the sending time interval between the two adjacent data packet groups in the service data flow. The receiving unit 1120 is further configured to receive channel state information CSI from a terminal device based on the data packet group sending interval. That the determining unit 1140 is configured to schedule a transmission resource of the data packet group based on the data packet group sending interval specifically includes: configured to determine, based on status information of one or more subcarriers indicated by the CSI, a sending occasion of the data packet group and the subcarrier for sending the data packet group. That the sending unit 1110 is configured to send the data packet group based on the characteristic information specifically includes: sending the data packet group based on the sending occasion of the data packet group and the subcarrier for sending the data packet group.

In a possible implementation method, the characteristic information further includes a pulse peak rate and a pulse interval that correspond to the data packet group, and the pulse interval is a sending time interval between two adjacent pulses corresponding to the data packet group. The determining unit 1140 is specifically configured to determine, based on the status information of the one or more subcarriers indicated by the CSI, the pulse peak rate, and the pulse interval, a quality requirement and a capacity requirement on the subcarrier for sending the data packet group; and determine, based on the quality requirement and the capacity requirement on the subcarrier for sending the data packet group, the sending occasion of the data packet group and the subcarrier for sending the data packet group.

In a possible implementation method, the sending unit 1110 is further configured to send configuration information to the terminal device, where the configuration information includes indication information and the data packet group sending interval, and the indication information indicates that a period in which the terminal device reports the CSI is the same as the data packet group sending interval. The receiving unit 1120 is configured to receive the CSI from the terminal device.

In a possible implementation method, the indication information further indicates the terminal device to report the CSI in first duration before a moment at which the data packet group arrives.

In a possible implementation method, the determining unit 1140 is further configured to determine, based on the data packet group sending interval, time when the data packet group arrives. The sending unit 1110 is further configured to send downlink control information DCI to the terminal device in second duration before a moment at which the data packet group arrives, to indicate the terminal device to report the CSI. The receiving unit 1120 is configured to receive the CSI from the terminal device.

In a possible implementation method, the characteristic information includes a sending time window of the data packet group, where the sending time window of the data packet group indicates maximum sending duration for sending the data packet group. That the sending unit 1110 is configured to send the data packet group based on the characteristic information specifically configured to: when a first data packet of the data packet group fails to be initially transmitted, determine remaining sending time of the data packet group based on the sending time window of the data packet group; and when retransmission time of the first data packet is longer than the remaining sending time of the data packet group, discard the first data packet.

In a possible implementation method, the characteristic information is from an application server; the characteristic information is from a database, and the characteristic information in the database is from an application server; or the characteristic information is from the session management network element, and the characteristic information in the session management network element is from an application server.

Optionally, the communication apparatus 1100 may further include a storage unit. The storage unit is configured to store data or instructions (which may also be referred to as code or a program). The foregoing units may interact with or be coupled to the storage unit, to implement a corresponding method or function.

It should be understood that division into the units in the apparatus is merely logical function division. During actual implementation, all or a part of the units may be integrated into one physical entity or may be physically separated. In addition, all the units in the apparatus may be implemented in a form of software invoked by a processing element, or may be implemented in a form of hardware; or a part of units may be implemented in a form of software invoked by a processing element, and a part of units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, the units may be all or partially integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of the integrated circuit forms. For another example, when the units in the apparatus may be implemented in a form of a program invoked by a processing element, the processing element may be a general-purpose processor, for example, a central processing unit (CPU) or another processor that can invoke the program. For still another example, the units may be integrated and implemented in a form of a system-on-a-chip (SoC).

The foregoing sending unit 1110 is an interface circuit of the apparatus, and is configured to send a signal to another apparatus. For example, when the apparatus is implemented by a chip, the sending unit 1110 is an interface circuit that is of the chip and that is configured to send a signal to another chip or apparatus. The foregoing receiving unit 1120 is an interface circuit of the apparatus, and is configured to receive a signal from another apparatus. For example, when the apparatus is implemented by a chip, the receiving unit 1120 is an interface circuit that is of the chip and that is configured to receive a signal from another chip or apparatus.

Figure 12:
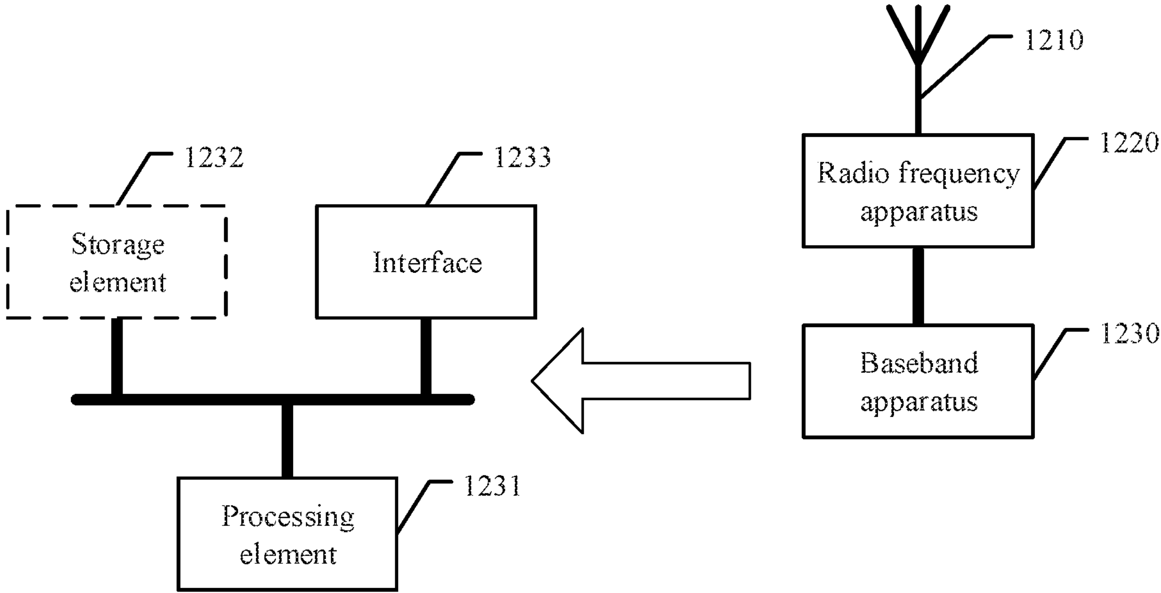
FIG. 12 is a schematic diagram of an access network device according to an embodiment of this application.

FIG. 12 is a schematic diagram of a structure of an access network device according to an embodiment of this application. The access network device is configured to implement operations of the access network device in the foregoing embodiments. As shown in FIG. 12, the access network device includes an antenna 1210, a radio frequency apparatus 1220, and a baseband apparatus 1230. The antenna 1210 is connected to the radio frequency apparatus 1220. In an uplink direction, the radio frequency apparatus 1220 receives, through the antenna 1210, information sent by a terminal device, and sends, to the baseband apparatus 1230, the information sent by the terminal device for processing. In a downlink direction, the baseband apparatus 1230 processes the information of the terminal device, and sends processed information to the radio frequency apparatus 1220. The radio frequency apparatus 1220 processes the information of the terminal device, and then sends the processed information to the terminal device through the antenna 1210.

The baseband apparatus 1230 may include one or more processing elements 1231, for example, include a main control CPU and another integrated circuit, and further include an interface 1233. In addition, the baseband apparatus 1230 may further include a storage element 1232. The storage element 1232 is configured to store a program and data. The interface 1233 is configured to exchange information with the radio frequency apparatus 1220. The interface is, for example, a common public radio interface (CPRI). The foregoing apparatus used in the access network device may be located in the baseband apparatus 1230. For example, the foregoing apparatus used in the access network device may be a chip in the baseband apparatus 1230. The chip includes at least one processing element and an interface circuit. The processing element is configured to perform the steps of any method performed by the access network device. The interface circuit is configured to communicate with another apparatus. In an implementation, units of the access network device that implement the steps in the foregoing methods may be implemented in a form of a program invoked by a processing element. For example, the apparatus used in the access network device includes a processing element and a storage element. The processing element invokes a program stored in the storage element, to perform the methods performed by the access network device in the foregoing method embodiments. The storage element may be a storage element located on a same chip as the processing element, namely, an on-chip storage element; or may be a storage element that is located on a different chip from the processing element, namely, an off-chip storage element.

In another implementation, units of the access network device that implement the steps in the foregoing method may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the access network device that implement the steps in the foregoing methods may be integrated together, and implemented in a form of a SoC. For example, the baseband apparatus includes the SoC chip, configured to implement the foregoing methods. At least one processing element and storage element may be integrated into the chip, and the processing element invokes a program stored in the storage element to implement the foregoing methods performed by the access network device. Alternatively, at least one integrated circuit may be integrated into the chip, to implement the foregoing methods performed by the access network device. Alternatively, with reference to the foregoing implementations, functions of a part of units may be implemented by invoking a program by the processing element, and functions of a part of units may be implemented by the integrated circuit.

It can be learned that the foregoing apparatus used in the access network device may include at least one processing element and interface circuit. The at least one processing element is configured to perform any one of the methods that are provided in the foregoing method embodiments and performed by the access network device. The processing element may perform some or all steps performed by the access network device, in a first manner, to be specific, by invoking the program stored in the storage element; or may perform some or all steps performed by the access network device, in a second manner, to be specific, by using a hardware integrated logic circuit in the processor element in combination with instructions; or may certainly perform, by combining the first manner and the second manner, some or all steps performed by the access network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits. The storage element may be one memory, or may be a general term of a plurality of storage elements.

Figure 13:
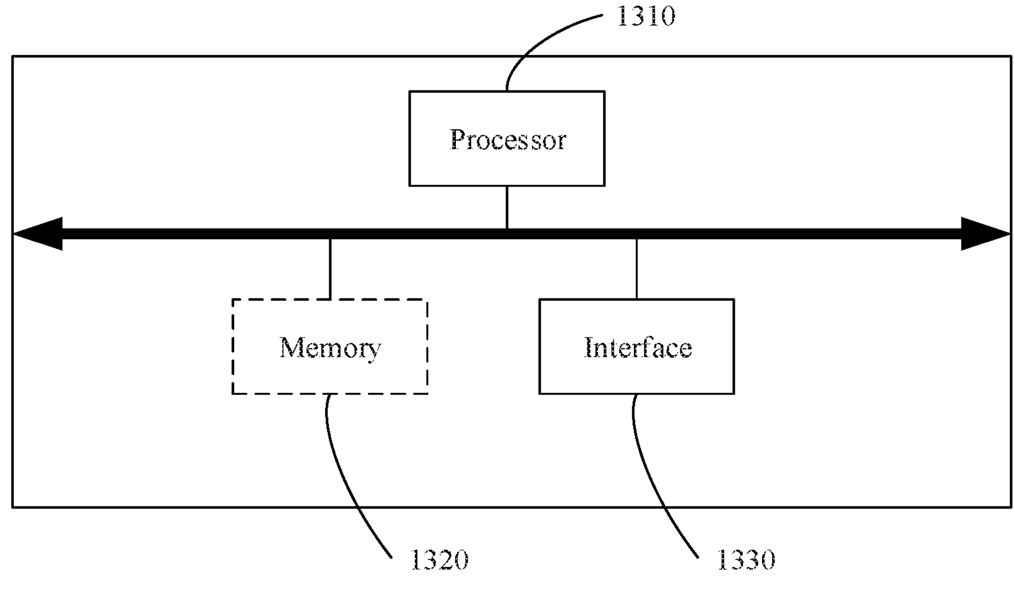
FIG. 13 is a schematic diagram of a user plane network element according to an embodiment of this application.

FIG. 13 is a schematic diagram of a user plane network element according to an embodiment of this application. The user plane network element is configured to implement operations of the user plane network element in the foregoing embodiments. As shown in FIG. 13, the user plane network element includes a processor 1310 and an interface 1330. Optionally, the user plane network element further includes a memory 1320. The interface 1330 is configured to implement communication with another device.

The method performed by the user plane network element in the foregoing embodiment may be implemented by the processor 1310 by invoking a program stored in a memory (which may be the memory 1320 in the user plane network element, or may be an external memory). In other words, the user plane network element may include the processor 1310, and the processor 1310 invokes the program in the memory, to perform the method performed by the user plane network element in the foregoing method embodiments. The processor herein may be an integrated circuit having a signal processing capability, for example, a CPU. The user plane network element may be implemented by using one or more integrated circuits configured to implement the foregoing method, for example, one or more ASICs, one or more microprocessors DSPs, one or more FPGAs, or a combination of at least two of the integrated circuit forms. Alternatively, the foregoing implementations may be referenced.

Specifically, functions/implementation processes of the sending unit 1010, the receiving unit 1020, the identification unit 1030, the adding unit 1040, and the shaping unit 1050 in FIG. 10 may be implemented by the processor 1310 in the user plane network element 1300 shown in FIG. 13 by invoking computer-executable instructions stored in the memory 1320. Alternatively, functions/implementation processes of the identification unit 1030, the adding unit 1040, and the shaping unit 1050 in FIG. 10 may be implemented by the processor 1310 in the user plane network element 1300 shown in FIG. 13 by invoking the computer-executable instructions stored in the memory 1320, and functions/implementation processes of the sending unit 1010 and the receiving unit 1020 in FIG. 10 may be implemented by the interface 1330 in the user plane network element 1300 shown in FIG. 13.

A person of ordinary skill in the art may understand that various numerals such as "first" and "second" in this application are merely used for differentiation for ease of description, and are not used to limit the scope of embodiments of this application or represent a sequence. The term "and/or" describes an association relationship for describing associated objects and represents that three relationships may exist. For example, A and/or B may represent the following three cases: Only A exists, both A and B exist, and only B exists. The character "/" generally represents an "or" relationship between associated objects. "At least one" means one or more. "At least two" means two or more. "At least one", "any one", or a similar expression thereof indicates any combination of the items, and includes a singular item or any combination of plural items. For example, at least one of a, b, or c may indicate: a, b, c, a and b, a and c, b and c, or a, b, and c, where a, b, and c may be singular or plural. The term "a plurality of" means two or more, and another quantifier is similar to this.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein.

All or a part of the foregoing embodiments may be implemented through software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate, transistor logic, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may be integrated into a processor. The processor and the storage medium may be disposed in an ASIC.

These computer program instructions may also be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

In one or more exemplary designs, the functions described in this application may be implemented by using hardware, software, firmware, or any combination thereof. If the present invention is implemented by software, these functions may be stored in a computer-readable medium or are transmitted to the computer-readable medium in a form of one or more instructions or code. The computer-readable medium is either a computer storage medium or a communication medium that enables a computer program to move from one place to another. The storage medium may be an available medium that may be accessed by any general-purpose or special computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code, where the program code is in a form of instructions or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk and the disc include a compact disc, a laser disc, an optical disc, a digital versatile disc (DVD for short), a floppy disk, and a Blu-ray disc. The disc usually copies data in a magnetic manner, and the disk usually optically copies data in a laser manner. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application. According to the foregoing descriptions of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A communication method, comprising:

receiving, by a user plane network element, characteristic information of a service data flow, wherein the characteristic information describes a characteristic of multiple data packet groups in the service data flow;

identifying, by the user plane network element, the multiple data packet groups in the service data flow based on the characteristic information of the service data flow, wherein the identifying, by the user plane network element, the multiple data packet groups in the service data flow based on the characteristic information of the service data flow comprises:

identifying, by the user plane network element based on the characteristic information of the service data flow, a first data packet group comprising a plurality of first data packets in the service data flow and a second data packet group comprising a plurality of second data packets in the service data flow;

adding, by the user plane network element, a first data packet group identifier to the plurality of first data packets of the first data packet group in the service data flow and a second data packet group identifier to the plurality of second data packets of the second data packet group in the service data flow, wherein the first data packet group identifier is different from the second data packet group identifier; and sending, by the user plane network element, the multiple data packet groups to an access network device.

2. The communication method according to claim 1, wherein:

the characteristic information comprises a data feature of an initial packet of the multiple data packet groups; and the identifying, by the user plane network element, the multiple data packet groups in the service data flow based on the characteristic information of the service data flow comprises:

identifying, by the user plane network element, the initial packet of the multiple data packet groups based on the data feature of the initial packet.

3. The communication method according to claim 1, wherein the characteristic information comprises a data feature of a tail packet of the multiple data packet groups; and the identifying, by the user plane network element, the multiple data packet groups in the service data flow based on the characteristic information of the service data flow comprises:

identifying, by the user plane network element, the tail packet of the multiple data packet groups based on the data feature of the tail packet.

4. The communication method according to claim 1, wherein:

the characteristic information is from an application server;

the characteristic information is from a database, and the characteristic information in the database is from an application server; or the characteristic information is from a session management network element, and the characteristic information in the session management network element is from an application server.

5. The communication method according to claim 1, further comprising:

sending, by a session management network element, the characteristic information to the user plane network element.

6. The communication method according to claim 5, wherein before sending, by the session management network element, the characteristic information to the user plane network element, the method further comprises:

sending, by a policy control function network element, a policy and charging control rule to the session management network element, wherein the policy and charging control rule comprises the characteristic information; and receiving, by the session management network element, the policy and charging control rule.

7. The communication method according to claim 6, further comprising:

sending, by an application function entity through a network exposure function network element, service data flow information to the policy control function network element; and generating, by the policy control function network element, the policy and charging control rule according to the service data flow information.

8. A user plane network element, comprising:

one or more processors; and a non-transitory computer-readable storage medium storing a program to be executed by the one or more processors, the program including instructions that when executed by the one or more processors, cause the user plane network element to perform operations comprising:

receiving characteristic information of a service data flow, wherein the characteristic information describes a characteristic of multiple data packet groups in the service data flow;

identifying the multiple data packet groups in the service data flow based on the characteristic information of the service data flow, wherein the identifying the multiple data packet groups in the service data flow based on the characteristic information of the service data flow comprises:

identifying, based on the characteristic information of the service data flow, a first data packet group comprising a plurality of first data packets in the service data flow and a second data packet group comprising a plurality of second data packets in the service data flow:

adding a first data packet group identifier to the plurality of first data packets of the first data packet group in the service data flow and a second data packet group identifier to the plurality of second data packets of the second data packet group in the service data flow, wherein the first data packet group identifier is different from the second data packet group identifier; and sending the multiple data packet groups to an access network device.

9. The user plane network element according to claim 8, wherein:

the characteristic information comprises a data feature of an initial packet of the multiple data packet groups; and the identifying the multiple data packet groups in the service data flow based on the characteristic information of the service data flow comprises:

identifying the initial packet of the multiple data packet groups based on the data feature of the initial packet.

10. The user plane network element according to claim 8, wherein the characteristic information comprises a data feature of a tail packet of the multiple data packet groups; and the identifying the multiple data packet groups in the service data flow based on the characteristic information of the service data flow comprises:

identifying the tail packet of the multiple data packet groups based on the data feature of the tail packet.

11. The user plane network element according to claim 8, wherein:

the characteristic information is from an application server;

the characteristic information is from a database, and the characteristic information in the database is from an application server; or the characteristic information is from a session management network element, and the characteristic information in the session management network element is from an application server.

12. A communication system, comprising a user plane network element and a session management network element, wherein:

the session management network element is configured to perform first operations comprising:

sending characteristic information of a service data flow to the user plane network element;

the user plane network element is configured to perform second operations comprising:

receiving the characteristic information of the service data flow, wherein the characteristic information describes a characteristic of multiple data packet groups in the service data flow;

identifying the multiple data packet groups in the service data flow based on the characteristic information of the service data flow, wherein the identifying the multiple data packet groups in the service data flow based on the characteristic information of the service data flow comprises:

identifying. based on the characteristic information of the service data flow, a first data packet group comprising a plurality of first data packets in the service data flow and a second data packet group comprising a plurality of second data packets in the service data flow;

adding a first data packet group identifier to the plurality of first data packets of the first data packet group in the service data flow and a second data packet group identifier to the plurality of second data packets of the second data packet group in the service data flow, wherein the first data packet group identifier is different from the second data packet group identifier; and sending the multiple data packet groups to an access network device.

13. The communication system according to claim 12, wherein:

the characteristic information comprises a data feature of an initial packet of the multiple data packet groups; and wherein identifying, by the user plane network element, the multiple data packet groups in the service data flow based on the characteristic information of the service data flow comprises:

identifying the initial packet of the multiple data packet groups based on the data feature of the initial packet.

14. The communication system according to claim 12, wherein the characteristic information comprises a data feature of a tail packet of the multiple data packet groups; and the identifying the multiple data packet groups in the service data flow based on the characteristic information of the service data flow comprises:

identifying the tail packet of the multiple data packet groups based on the data feature of the tail packet.

15. The communication system according to claim 12, further comprising:

a policy control function network element configured to, before the session management network element sends the characteristic information to the user plane network element, send a policy and charging control rule to the session management network element, wherein the policy and charging control rule comprises the characteristic information; and wherein the session management network element is configured to receive the policy and charging control rule.

16. The communication system according to claim 15, further comprising:

an application function entity configured to send, through a network exposure function network element, service data flow information to the policy control function network element; and wherein the policy control function network element is configured to generate the policy and charging control rule according to the service data flow information.

* * * * *